United States Patent
Mullis et al.

(10) Patent No.: US 9,497,429 B2
(45) Date of Patent: Nov. 15, 2016

(54) EXTENDED COLOR PROCESSING ON PELICAN ARRAY CAMERAS

(71) Applicant: Pelican Imaging Corporation, Santa Clara, CA (US)

(72) Inventors: Robert Mullis, Santa Cruz, CA (US); Dan Lelescu, Morgan Hill, CA (US); (Continued)

(73) Assignee: Pelican Imaging Corporation, Santa Clara, CA (US)

( * ) Notice: Subject to any disclaimer, the term of this patent is extended or adjusted under 35 U.S.C. 154(b) by 340 days.

(21) Appl. No.: 14/145,734

(22) Filed: Dec. 31, 2013

(65) Prior Publication Data
US 2014/0267762 A1 Sep. 18, 2014

Related U.S. Application Data

(60) Provisional application No. 61/798,602, filed on Mar. 15, 2013.

(51) Int. Cl.
*H04N 5/33* (2006.01)
*H04N 5/265* (2006.01)
(Continued)

(52) U.S. Cl.
CPC .............. *H04N 9/093* (2013.01); *H04N 5/265* (2013.01); *H04N 5/332* (2013.01); *H04N 9/09* (2013.01)

(58) Field of Classification Search
CPC .......... H04N 5/265; H04N 5/332; H04N 9/09; H04N 9/093
(Continued)

(56) References Cited

U.S. PATENT DOCUMENTS 4,124,798 A 11/1978 Thompson
4,198,646 A 4/1980 Alexander et al.
(Continued)

FOREIGN PATENT DOCUMENTS

CN 1839394 A 9/2006
CN 101010619 A 8/2007
(Continued)

OTHER PUBLICATIONS

Bennett et al., Multispectral Bilateral Video Fusion, 2007, IEEE Transactions on Image Processing, vol. 16, No. 5, pp. 1185-1194.*
(Continued)

*Primary Examiner* — Christopher S Kelley
*Assistant Examiner* — Kathleen Walsh
(74) *Attorney, Agent, or Firm* — KPPB LLP

(57) ABSTRACT

Systems and methods for extended color processing on Pelican array cameras in accordance with embodiments of the invention are disclosed. In one embodiment, a method of generating a high resolution image includes obtaining input images, where a first set of images includes information in a first band of visible wavelengths and a second set of images includes information in a second band of visible wavelengths and non-visible wavelengths, determining an initial estimate by combining the first set of images into a first fused image, combining the second set of images into a second fused image, spatially registering the fused images, denoising the fused images using bilateral filters, normalizing the second fused image in the photometric reference space of the first fused image, combining the fused images, determining a high resolution image that when mapped through a forward imaging transformation matches the input images within at least one predetermined criterion.

32 Claims, 16 Drawing Sheets

(72) Inventors: Kartik Venkataraman, San Jose, CA (US)

(51) Int. Cl.
*H04N 9/093* (2006.01)
*H04N 9/09* (2006.01)

(58) Field of Classification Search
USPC .................................. 348/162, 164, 262–264
See application file for complete search history.

(56) References Cited

U.S. PATENT DOCUMENTS

| | | | |
|---|---|---|---|
| 4,323,925 A | 4/1982 | Abell et al. | |
| 4,460,449 A | 7/1984 | Montalbano | |
| 4,467,365 A | 8/1984 | Murayama et al. | |
| 5,005,083 A | 4/1991 | Grage | |
| 5,070,414 A | 12/1991 | Tsutsumi | |
| 5,144,448 A | 9/1992 | Hornbaker | |
| 5,325,449 A * | 6/1994 | Burt | G06T 5/50 348/E7.086 |
| 5,327,125 A | 7/1994 | Iwase et al. | |
| 5,488,674 A * | 1/1996 | Burt | G06T 5/50 345/639 |
| 5,629,524 A | 5/1997 | Stettner et al. | |
| 5,808,350 A | 9/1998 | Jack et al. | |
| 5,832,312 A | 11/1998 | Rieger et al. | |
| 5,880,691 A | 3/1999 | Fossum et al. | |
| 5,911,008 A | 6/1999 | Hamada et al. | |
| 5,933,190 A | 8/1999 | Dierickx et al. | |
| 5,973,844 A | 10/1999 | Burger | |
| 6,002,743 A | 12/1999 | Telymonde | |
| 6,005,607 A | 12/1999 | Uomori et al. | |
| 6,034,690 A | 3/2000 | Gallery et al. | |
| 6,069,351 A | 5/2000 | Mack | |
| 6,069,365 A | 5/2000 | Chow et al. | |
| 6,097,394 A | 8/2000 | Levoy et al. | |
| 6,124,974 A | 9/2000 | Burger | |
| 6,137,100 A | 10/2000 | Fossum et al. | |
| 6,137,535 A | 10/2000 | Meyers | |
| 6,141,048 A | 10/2000 | Meyers | |
| 6,160,909 A | 12/2000 | Melen | |
| 6,163,414 A | 12/2000 | Kikuchi et al. | |
| 6,172,352 B1 | 1/2001 | Liu et al. | |
| 6,175,379 B1 | 1/2001 | Uomori et al. | |
| 6,205,241 B1 | 3/2001 | Melen | |
| 6,239,909 B1 | 5/2001 | Hayashi et al. | |
| 6,358,862 B1 | 3/2002 | Ireland et al. | |
| 6,443,579 B1 | 9/2002 | Myers et al. | |
| 6,476,805 B1 | 11/2002 | Shum et al. | |
| 6,477,260 B1 | 11/2002 | Shimomura | |
| 6,502,097 B1 | 12/2002 | Chan et al. | |
| 6,525,302 B2 | 2/2003 | Dowski, Jr. et al. | |
| 6,563,537 B1 | 5/2003 | Kawamura et al. | |
| 6,571,466 B1 | 6/2003 | Glenn et al. | |
| 6,603,513 B1 | 8/2003 | Berezin | |
| 6,611,289 B1 | 8/2003 | Yu | |
| 6,627,896 B1 | 9/2003 | Hashimoto et al. | |
| 6,628,330 B1 | 9/2003 | Lin | |
| 6,635,941 B2 | 10/2003 | Suda | |
| 6,639,596 B1 | 10/2003 | Shum et al. | |
| 6,647,142 B1 | 11/2003 | Beardsley | |
| 6,657,218 B2 | 12/2003 | Noda | |
| 6,671,399 B1 | 12/2003 | Berestov | |
| 6,750,904 B1 | 6/2004 | Lambert | |
| 6,765,617 B1 | 7/2004 | Tangen et al. | |
| 6,771,833 B1 | 8/2004 | Edgar | |
| 6,774,941 B1 | 8/2004 | Boisvert et al. | |
| 6,795,253 B2 | 9/2004 | Shinohara | |
| 6,819,328 B1 | 11/2004 | Moriwaki et al. | |
| 6,819,358 B1 | 11/2004 | Kagle et al. | |
| 6,879,735 B1 | 4/2005 | Portniaguine et al. | |
| 6,903,770 B1 | 6/2005 | Kobayashi et al. | |
| 6,909,121 B2 | 6/2005 | Nishikawa | |
| 6,927,922 B2 | 8/2005 | George et al. | |
| 6,958,862 B1 | 10/2005 | Joseph | |
| 7,015,954 B1 | 3/2006 | Foote et al. | |
| 7,085,409 B2 | 8/2006 | Sawhney et al. | |
| 7,161,614 B1 | 1/2007 | Yamashita et al. | |
| 7,199,348 B2 * | 4/2007 | Olsen | G02B 3/0062 250/208.1 |
| 7,206,449 B2 | 4/2007 | Raskar et al. | |
| 7,235,785 B2 | 6/2007 | Hornback et al. | |
| 7,262,799 B2 | 8/2007 | Suda | |
| 7,292,735 B2 | 11/2007 | Blake et al. | |
| 7,295,697 B1 | 11/2007 | Satoh | |
| 7,369,165 B2 | 5/2008 | Bosco et al. | |
| 7,391,572 B2 | 6/2008 | Jacobowitz et al. | |
| 7,408,725 B2 | 8/2008 | Sato | |
| 7,425,984 B2 | 9/2008 | Chen | |
| 7,496,293 B2 * | 2/2009 | Shamir | G03B 7/08 348/216.1 |
| 7,564,019 B2 * | 7/2009 | Olsen | G02B 3/0062 250/208.1 |
| 7,606,484 B1 | 10/2009 | Richards et al. | |
| 7,620,265 B1 * | 11/2009 | Wolff | G06T 5/50 382/254 |
| 7,633,511 B2 | 12/2009 | Shum et al. | |
| 7,639,435 B2 | 12/2009 | Chiang et al. | |
| 7,646,549 B2 | 1/2010 | Zalevsky et al. | |
| 7,657,090 B2 | 2/2010 | Omatsu et al. | |
| 7,675,080 B2 | 3/2010 | Boettiger | |
| 7,675,681 B2 | 3/2010 | Tomikawa et al. | |
| 7,706,634 B2 | 4/2010 | Schmitt et al. | |
| 7,723,662 B2 | 5/2010 | Levoy et al. | |
| 7,738,013 B2 | 6/2010 | Galambos et al. | |
| 7,782,364 B2 | 8/2010 | Smith | |
| 7,826,153 B2 | 11/2010 | Hong | |
| 7,840,067 B2 | 11/2010 | Shen et al. | |
| 7,912,673 B2 | 3/2011 | Hébert et al. | |
| 7,973,834 B2 | 7/2011 | Yang | |
| 7,986,018 B2 | 7/2011 | Rennie | |
| 7,990,447 B2 | 8/2011 | Honda et al. | |
| 8,000,498 B2 | 8/2011 | Shih et al. | |
| 8,013,904 B2 | 9/2011 | Tan et al. | |
| 8,027,531 B2 | 9/2011 | Wilburn et al. | |
| 8,044,994 B2 | 10/2011 | Vetro et al. | |
| 8,077,245 B2 | 12/2011 | Adamo et al. | |
| 8,098,297 B2 | 1/2012 | Crisan et al. | |
| 8,098,304 B2 | 1/2012 | Pinto et al. | |
| 8,106,949 B2 | 1/2012 | Tan et al. | |
| 8,126,279 B2 | 2/2012 | Marcellin et al. | |
| 8,130,120 B2 | 3/2012 | Kawabata et al. | |
| 8,131,097 B2 | 3/2012 | Lelescu et al. | |
| 8,164,629 B1 | 4/2012 | Zhang | |
| 8,169,486 B2 | 5/2012 | Corcoran et al. | |
| 8,180,145 B2 | 5/2012 | Wu et al. | |
| 8,189,065 B2 | 5/2012 | Georgiev et al. | |
| 8,189,089 B1 | 5/2012 | Georgiev | |
| 8,194,296 B2 * | 6/2012 | Compton | H04N 9/045 358/500 |
| 8,212,914 B2 | 7/2012 | Chiu | |
| 8,213,711 B2 | 7/2012 | Tam | |
| 8,231,814 B2 | 7/2012 | Duparre | |
| 8,242,426 B2 | 8/2012 | Ward et al. | |
| 8,244,027 B2 | 8/2012 | Takahashi | |
| 8,244,058 B1 | 8/2012 | Intwala et al. | |
| 8,254,668 B2 | 8/2012 | Mashitani et al. | |
| 8,279,325 B2 | 10/2012 | Pitts et al. | |
| 8,280,194 B2 | 10/2012 | Wong et al. | |
| 8,289,409 B2 | 10/2012 | Chang | |
| 8,289,440 B2 | 10/2012 | Pitts et al. | |
| 8,290,358 B1 | 10/2012 | Georgiev | |
| 8,294,099 B2 | 10/2012 | Blackwell, Jr. | |
| 8,305,456 B1 | 11/2012 | McMahon | |
| 8,315,476 B1 | 11/2012 | Georgiev et al. | |
| 8,345,144 B1 | 1/2013 | Georgiev et al. | |
| 8,360,574 B2 | 1/2013 | Ishak et al. | |
| 8,400,555 B1 | 3/2013 | Georgiev | |
| 8,406,562 B2 | 3/2013 | Bassi et al. | |
| 8,411,146 B2 * | 4/2013 | Twede | H04N 5/332 250/225 |
| 8,446,492 B2 | 5/2013 | Nakano et al. | |
| 8,456,517 B2 | 6/2013 | Mor et al. | |
| 8,493,496 B2 | 7/2013 | Freedman et al. | |

(56) References Cited

U.S. PATENT DOCUMENTS

| | | |
|---|---|---|
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,559,756 B2 | 10/2013 | Georgiev et al. |
| 8,565,547 B2 * | 10/2013 | Strandemar .......... G06K 9/6289 348/164 |
| 8,577,183 B2 * | 11/2013 | Robinson .............. G01J 3/2823 348/162 |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,773,536 B1 | 7/2014 | Zhang |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman et al. |
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 * | 10/2014 | Venkataraman ..... H04N 5/2253 348/218.1 |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,896,594 B2 | 11/2014 | Xiong et al. |
| 8,896,719 B1 | 11/2014 | Venkataraman et al. |
| 8,902,321 B2 * | 12/2014 | Venkataraman .. H01L 27/14618 348/218.1 |
| 8,928,793 B2 | 1/2015 | Mcmahon |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman et al. |
| 9,031,343 B2 | 5/2015 | Venkataraman et al. |
| 9,036,928 B2 | 5/2015 | Venkataraman et al. |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,055,233 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Ciurea et al. |
| 9,185,276 B2 | 11/2015 | Roda et al. |
| 9,188,765 B2 | 11/2015 | Venkataraman et al. |
| 9,191,580 B2 | 11/2015 | Venkataraman et al. |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,253,380 B2 | 2/2016 | Venkataraman et al. |
| 9,256,974 B1 | 2/2016 | Hines |
| 9,264,592 B2 | 2/2016 | Rodda et al. |
| 9,264,610 B2 | 2/2016 | Duparre |
| 2001/0005225 A1 | 6/2001 | Clark et al. |
| 2001/0019621 A1 | 9/2001 | Hanna et al. |
| 2001/0038387 A1 | 11/2001 | Tomooka et al. |
| 2002/0012056 A1 | 1/2002 | Trevino |
| 2002/0015536 A1 * | 2/2002 | Warren .................... G06T 5/50 382/284 |
| 2002/0027608 A1 | 3/2002 | Johnson |
| 2002/0039438 A1 | 4/2002 | Mori et al. |
| 2002/0057845 A1 | 5/2002 | Fossum |
| 2002/0063807 A1 | 5/2002 | Margulis |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0122113 A1 | 9/2002 | Foote et al. |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0190072 A1 | 10/2003 | Adkins et al. |
| 2003/0211405 A1 | 11/2003 | Venkataraman |
| 2004/0008271 A1 | 1/2004 | Hagimori et al. |
| 2004/0012689 A1 | 1/2004 | Tinnerino et al. |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 * | 4/2004 | Irani .................... G06T 7/0038 382/284 |
| 2004/0100570 A1 | 5/2004 | Shizukuishi |
| 2004/0105021 A1 | 6/2004 | Hu et al. |
| 2004/0114807 A1 | 6/2004 | Lelescu et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179834 A1 | 9/2004 | Szajewski et al. |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0128595 A1 | 6/2005 | Shimizu |
| 2005/0132098 A1 | 6/2005 | Sonoda et al. |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler |
| 2005/0224843 A1 | 10/2005 | Boemler |
| 2005/0225654 A1 | 10/2005 | Feldman et al. |
| 2005/0265633 A1 * | 12/2005 | Piacentino ................ G06T 5/50 382/302 |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0018509 A1 | 1/2006 | Miyoshi |
| 2006/0023197 A1 | 2/2006 | Joel |

(56) References Cited

U.S. PATENT DOCUMENTS

| | | |
|---|---|---|
| 2006/0023314 A1 | 2/2006 | Boettiger et al. |
| 2006/0028476 A1 | 2/2006 | Sobel et al. |
| 2006/0033005 A1 | 2/2006 | Jerdev et al. |
| 2006/0034003 A1 | 2/2006 | Zalevsky |
| 2006/0038891 A1 | 2/2006 | Okutomi et al. |
| 2006/0049930 A1 | 3/2006 | Zruya et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203113 A1 | 9/2006 | Wada et al. |
| 2006/0210186 A1 | 9/2006 | Berkner |
| 2006/0214085 A1 | 9/2006 | Olsen |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146511 A1 | 6/2007 | Kinoshita et al. |
| 2007/0153335 A1* | 7/2007 | Hosaka .................. H04N 1/58 358/463 |
| 2007/0158427 A1 | 7/2007 | Zhu et al. |
| 2007/0159541 A1 | 7/2007 | Sparks et al. |
| 2007/0160310 A1* | 7/2007 | Tanida .................. G06T 3/40 382/276 |
| 2007/0165931 A1 | 7/2007 | Higaki |
| 2007/0171290 A1 | 7/2007 | Kroger |
| 2007/0182843 A1 | 8/2007 | Shimamura et al. |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer |
| 2007/0247517 A1* | 10/2007 | Zhang .................. G06K 9/2018 348/30 |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263114 A1 | 11/2007 | Gurevich et al. |
| 2007/0268374 A1 | 11/2007 | Robinson |
| 2007/0296832 A1 | 12/2007 | Ota et al. |
| 2007/0296835 A1 | 12/2007 | Olsen et al. |
| 2007/0296847 A1 | 12/2007 | Chang et al. |
| 2007/0297696 A1* | 12/2007 | Hamza .................. G06T 7/0028 382/294 |
| 2008/0006859 A1 | 1/2008 | Mionetto et al. |
| 2008/0019611 A1 | 1/2008 | Larkin |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz |
| 2008/0099804 A1 | 5/2008 | Venezia et al. |
| 2008/0112059 A1 | 5/2008 | Choi et al. |
| 2008/0112635 A1 | 5/2008 | Kondo et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152296 A1 | 6/2008 | Oh et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0187305 A1 | 8/2008 | Raskar et al. |
| 2008/0193026 A1 | 8/2008 | Horie et al. |
| 2008/0211737 A1 | 9/2008 | Kim et al. |
| 2008/0218610 A1 | 9/2008 | Chapman et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0284880 A1* | 11/2008 | Numata .................. H04N 5/217 348/241 |
| 2008/0298674 A1 | 12/2008 | Baker et al. |
| 2008/0310501 A1 | 12/2008 | Ward et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan et al. |
| 2009/0128833 A1 | 5/2009 | Yahav |
| 2009/0129667 A1 | 5/2009 | Ho |
| 2009/0140131 A1 | 6/2009 | Utagawa et al. |
| 2009/0152664 A1 | 6/2009 | Klem et al. |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan et al. |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0013927 A1 | 1/2010 | Nixon |
| 2010/0044815 A1 | 2/2010 | Chang et al. |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |

(56) References Cited

U.S. PATENT DOCUMENTS

| | | |
|---|---|---|
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang et al. |
| 2010/0177411 A1 | 7/2010 | Hegde et al. |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0202054 A1 | 8/2010 | Niederer |
| 2010/0202683 A1* | 8/2010 | Robinson ............... G01J 5/08 382/164 |
| 2010/0208100 A9 | 8/2010 | Olsen et al. |
| 2010/0220212 A1 | 9/2010 | Perlman et al. |
| 2010/0231285 A1 | 9/2010 | Boomer et al. |
| 2010/0244165 A1 | 9/2010 | Lake et al. |
| 2010/0265381 A1 | 10/2010 | Yamamoto et al. |
| 2010/0265385 A1 | 10/2010 | Knight et al. |
| 2010/0281070 A1 | 11/2010 | Chan et al. |
| 2010/0302423 A1 | 12/2010 | Adams, Jr. et al. |
| 2010/0309292 A1 | 12/2010 | Ho et al. |
| 2010/0321595 A1 | 12/2010 | Chiu et al. |
| 2011/0001037 A1 | 1/2011 | Tewinkle |
| 2011/0018973 A1 | 1/2011 | Takayama |
| 2011/0019243 A1 | 1/2011 | Constant, Jr. et al. |
| 2011/0031381 A1 | 2/2011 | Tay et al. |
| 2011/0032370 A1 | 2/2011 | Ludwig |
| 2011/0033129 A1* | 2/2011 | Robinson ............... G01J 3/2823 382/254 |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0069189 A1* | 3/2011 | Venkataraman .. H01L 27/14618 348/218.1 |
| 2011/0080487 A1* | 4/2011 | Venkataraman ..... H04N 5/2253 348/218.1 |
| 2011/0085028 A1 | 4/2011 | Samadani et al. |
| 2011/0108708 A1 | 5/2011 | Olsen et al. |
| 2011/0121421 A1 | 5/2011 | Charbon et al. |
| 2011/0122308 A1* | 5/2011 | Duparre ............ H01L 27/14621 348/340 |
| 2011/0128393 A1 | 6/2011 | Tavi et al. |
| 2011/0128412 A1 | 6/2011 | Milnes et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0176020 A1 | 7/2011 | Chang |
| 2011/0181797 A1 | 7/2011 | Galstian et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra |
| 2011/0228144 A1 | 9/2011 | Tian et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0255592 A1 | 10/2011 | Sung et al. |
| 2011/0255745 A1 | 10/2011 | Hodder et al. |
| 2011/0261993 A1 | 10/2011 | Weiming et al. |
| 2011/0267348 A1 | 11/2011 | Lin et al. |
| 2011/0273531 A1 | 11/2011 | Ito et al. |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285866 A1 | 11/2011 | Bhrugumalla et al. |
| 2011/0285910 A1 | 11/2011 | Bamji et al. |
| 2011/0292216 A1* | 12/2011 | Fergus .................. G03B 15/03 348/164 |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1* | 1/2012 | Pain ...................... H04N 5/345 250/332 |
| 2012/0019700 A1* | 1/2012 | Gaber .................. H04N 5/332 348/311 |
| 2012/0026297 A1 | 2/2012 | Sato |
| 2012/0026342 A1 | 2/2012 | Yu et al. |
| 2012/0026451 A1 | 2/2012 | Nystrom |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0062697 A1* | 3/2012 | Treado .................. H04N 5/332 348/42 |
| 2012/0062702 A1 | 3/2012 | Jiang et al. |
| 2012/0069235 A1 | 3/2012 | Imai |
| 2012/0105691 A1 | 5/2012 | Waqas et al. |
| 2012/0113318 A1 | 5/2012 | Galstian et al. |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0163672 A1 | 6/2012 | McKinnon et al. |
| 2012/0169433 A1 | 7/2012 | Mullins |
| 2012/0170134 A1 | 7/2012 | Bolis et al. |
| 2012/0176479 A1 | 7/2012 | Mayhew et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200734 A1 | 8/2012 | Tang |
| 2012/0224083 A1 | 9/2012 | Jovanovski et al. |
| 2012/0229628 A1 | 9/2012 | Ishiyama et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0262601 A1 | 10/2012 | Choi |
| 2012/0262607 A1 | 10/2012 | Shimura et al. |
| 2012/0268574 A1 | 10/2012 | Gidon et al. |
| 2012/0287291 A1 | 11/2012 | McMahon et al. |
| 2012/0293695 A1 | 11/2012 | Tanaka |
| 2012/0307099 A1 | 12/2012 | Yahata et al. |
| 2012/0314033 A1 | 12/2012 | Lee et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0050504 A1 | 2/2013 | Safaee-Rad et al. |
| 2013/0050526 A1 | 2/2013 | Keelan |
| 2013/0057710 A1 | 3/2013 | Mcmahon |
| 2013/0070060 A1 | 3/2013 | Chatterjee |
| 2013/0076967 A1 | 3/2013 | Brunner et al. |
| 2013/0077880 A1 | 3/2013 | Venkataraman et al. |
| 2013/0077882 A1 | 3/2013 | Venkataraman et al. |
| 2013/0088489 A1 | 4/2013 | Schmeitz et al. |
| 2013/0088637 A1 | 4/2013 | Duparre |
| 2013/0107061 A1* | 5/2013 | Kumar ................. H04N 5/2258 348/207.1 |
| 2013/0113899 A1 | 5/2013 | Morohoshi et al. |

(56) References Cited

U.S. PATENT DOCUMENTS

| | | | |
|---|---|---|---|
| 2013/0113939 A1* | 5/2013 | Strandemar | G06T 5/10 348/164 |
| 2013/0120605 A1 | 5/2013 | Georgiev et al. | |
| 2013/0128068 A1 | 5/2013 | Georgiev et al. | |
| 2013/0128069 A1 | 5/2013 | Georgiev et al. | |
| 2013/0128087 A1 | 5/2013 | Georgiev et al. | |
| 2013/0128121 A1 | 5/2013 | Agarwala et al. | |
| 2013/0147979 A1 | 6/2013 | McMahon et al. | |
| 2013/0215108 A1 | 8/2013 | McMahon et al. | |
| 2013/0215231 A1 | 8/2013 | Hiramoto et al. | |
| 2013/0222556 A1 | 8/2013 | Shimada | |
| 2013/0223759 A1 | 8/2013 | Nishiyama et al. | |
| 2013/0229540 A1 | 9/2013 | Farina et al. | |
| 2013/0250123 A1* | 9/2013 | Zhang | G06T 7/0028 348/164 |
| 2013/0259317 A1 | 10/2013 | Gaddy | |
| 2013/0265459 A1 | 10/2013 | Duparre et al. | |
| 2013/0274923 A1 | 10/2013 | By et al. | |
| 2013/0293760 A1 | 11/2013 | Nisenzon et al. | |
| 2014/0002674 A1 | 1/2014 | Duparre et al. | |
| 2014/0009586 A1 | 1/2014 | McNamer et al. | |
| 2014/0037137 A1 | 2/2014 | Broaddus et al. | |
| 2014/0037140 A1 | 2/2014 | Benhimane et al. | |
| 2014/0043507 A1 | 2/2014 | Wang et al. | |
| 2014/0076336 A1 | 3/2014 | Clayton et al. | |
| 2014/0079336 A1 | 3/2014 | Venkataraman et al. | |
| 2014/0092281 A1 | 4/2014 | Nisenzon et al. | |
| 2014/0098267 A1 | 4/2014 | Tian et al. | |
| 2014/0104490 A1 | 4/2014 | Hsieh et al. | |
| 2014/0118493 A1 | 5/2014 | Sali et al. | |
| 2014/0118584 A1 | 5/2014 | Lee et al. | |
| 2014/0132810 A1 | 5/2014 | McMahon | |
| 2014/0146201 A1 | 5/2014 | Knight et al. | |
| 2014/0176592 A1 | 6/2014 | Wilburn et al. | |
| 2014/0192253 A1 | 7/2014 | Laroia | |
| 2014/0198188 A1 | 7/2014 | Izawa | |
| 2014/0204183 A1 | 7/2014 | Lee et al. | |
| 2014/0218546 A1 | 8/2014 | Mcmahon | |
| 2014/0232822 A1 | 8/2014 | Venkataraman et al. | |
| 2014/0240528 A1 | 8/2014 | Venkataraman et al. | |
| 2014/0240529 A1 | 8/2014 | Venkataraman et al. | |
| 2014/0253738 A1 | 9/2014 | Mullis | |
| 2014/0267243 A1 | 9/2014 | Venkataraman et al. | |
| 2014/0267286 A1 | 9/2014 | Duparre | |
| 2014/0267633 A1 | 9/2014 | Venkataraman et al. | |
| 2014/0267890 A1 | 9/2014 | Lelescu et al. | |
| 2014/0285675 A1 | 9/2014 | Mullis | |
| 2014/0313315 A1 | 10/2014 | Shoham et al. | |
| 2014/0321712 A1 | 10/2014 | Ciurea et al. | |
| 2014/0333731 A1 | 11/2014 | Venkataraman et al. | |
| 2014/0333764 A1 | 11/2014 | Venkataraman et al. | |
| 2014/0333787 A1 | 11/2014 | Venkataraman et al. | |
| 2014/0340539 A1 | 11/2014 | Venkataraman et al. | |
| 2014/0347509 A1 | 11/2014 | Venkataraman et al. | |
| 2014/0347748 A1 | 11/2014 | Duparre | |
| 2014/0354773 A1 | 12/2014 | Venkataraman et al. | |
| 2014/0354843 A1 | 12/2014 | Venkataraman et al. | |
| 2014/0354844 A1 | 12/2014 | Venkataraman et al. | |
| 2014/0354853 A1 | 12/2014 | Venkataraman et al. | |
| 2014/0354854 A1 | 12/2014 | Venkataraman et al. | |
| 2014/0354855 A1 | 12/2014 | Venkataraman et al. | |
| 2014/0355870 A1 | 12/2014 | Venkataraman et al. | |
| 2014/0368662 A1 | 12/2014 | Venkataraman et al. | |
| 2014/0368683 A1 | 12/2014 | Venkataraman et al. | |
| 2014/0368684 A1 | 12/2014 | Venkataraman et al. | |
| 2014/0368685 A1 | 12/2014 | Venkataraman et al. | |
| 2014/0368686 A1 | 12/2014 | Duparre | |
| 2014/0369612 A1 | 12/2014 | Venkataraman et al. | |
| 2014/0369615 A1 | 12/2014 | Venkataraman et al. | |
| 2014/0376825 A1 | 12/2014 | Venkataraman et al. | |
| 2014/0376826 A1 | 12/2014 | Venkataraman et al. | |
| 2015/0003752 A1 | 1/2015 | Venkataraman et al. | |
| 2015/0003753 A1 | 1/2015 | Venkataraman et al. | |
| 2015/0009353 A1 | 1/2015 | Venkataraman et al. | |
| 2015/0009354 A1 | 1/2015 | Venkataraman et al. | |
| 2015/0009362 A1 | 1/2015 | Venkataraman et al. | |
| 2015/0015669 A1 | 1/2015 | Venkataraman et al. | |
| 2015/0035992 A1 | 2/2015 | Mullis | |
| 2015/0036014 A1 | 2/2015 | Lelescu et al. | |
| 2015/0036015 A1 | 2/2015 | Lelescu et al. | |
| 2015/0042766 A1 | 2/2015 | Ciurea et al. | |
| 2015/0042767 A1 | 2/2015 | Ciurea et al. | |
| 2015/0042833 A1 | 2/2015 | Lelescu et al. | |
| 2015/0049915 A1 | 2/2015 | Ciurea et al. | |
| 2015/0049916 A1 | 2/2015 | Ciurea et al. | |
| 2015/0049917 A1 | 2/2015 | Ciurea et al. | |
| 2015/0055884 A1 | 2/2015 | Venkataraman et al. | |
| 2015/0091900 A1 | 4/2015 | Yang et al. | |
| 2015/0122411 A1 | 5/2015 | Rodda et al. | |
| 2015/0124113 A1 | 5/2015 | Rodda et al. | |
| 2015/0124151 A1 | 5/2015 | Rodda et al. | |
| 2015/0146030 A1 | 5/2015 | Venkataraman et al. | |
| 2015/0199841 A1 | 7/2015 | Venkataraman et al. | |
| 2015/0296137 A1 | 10/2015 | Duparre et al. | |
| 2015/0312455 A1 | 10/2015 | Venkataraman et al. | |
| 2015/0326852 A1 | 11/2015 | Duparre et al. | |
| 2016/0037097 A1 | 2/2016 | Duparre | |
| 2016/0044252 A1 | 2/2016 | Molina | |
| 2016/0044257 A1 | 2/2016 | Venkataraman et al. | |
| 2016/0057332 A1 | 2/2016 | Ciurea et al. | |

FOREIGN PATENT DOCUMENTS

| | | |
|---|---|---|
| CN | 101427372 A | 5/2009 |
| CN | 101606086 A | 12/2009 |
| EP | 840502 A2 | 5/1998 |
| EP | 1201407 A2 | 5/2002 |
| EP | 1734766 A2 | 12/2006 |
| EP | 2026563 A1 | 2/2009 |
| EP | 2104334 A1 | 9/2009 |
| EP | 2244484 A1 | 10/2010 |
| EP | 2336816 A2 | 6/2011 |
| GB | 2482022 A | 1/2012 |
| JP | 59025483 | 9/1984 |
| JP | 64037177 | 7/1989 |
| JP | 02285772 A | 11/1990 |
| JP | 09181913 A | 7/1997 |
| JP | 11142609 A | 5/1999 |
| JP | 11223708 A | 8/1999 |
| JP | 2002205310 A | 7/2002 |
| JP | 2002252338 A | 9/2002 |
| JP | 2003094445 A | 4/2003 |
| JP | 2003163938 A | 6/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005354124 A | 12/2005 |
| JP | 2006033493 A | 2/2006 |
| JP | 2006047944 A | 2/2006 |
| JP | 2006258930 A | 9/2006 |
| JP | 2007520107 A | 7/2007 |
| JP | 2008055908 A | 3/2008 |
| JP | 2008507874 A | 3/2008 |
| JP | 2008258885 A | 10/2008 |
| JP | 2009132010 A | 6/2009 |
| JP | 2011017764 A | 1/2011 |
| JP | 2011109484 A | 6/2011 |
| JP | 2013526801 A | 6/2013 |
| JP | 2014521117 A | 8/2014 |
| KR | 1020110097647 A | 8/2011 |
| TW | 200939739 A | 9/2009 |
| WO | 2007083579 A1 | 7/2007 |
| WO | 2008108271 A1 | 9/2008 |
| WO | 2008108926 A1 | 9/2008 |
| WO | 2008150817 A1 | 12/2008 |
| WO | 2009151903 A2 | 12/2009 |
| WO | 2009157273 A1 | 12/2009 |
| WO | 2011008443 A2 | 1/2011 |
| WO | 2011055655 A1 | 5/2011 |
| WO | 2011063347 A2 | 5/2011 |
| WO | 2011116203 A1 | 9/2011 |
| WO | 2011063347 A3 | 10/2011 |
| WO | 2011143501 A1 | 11/2011 |

(56) References Cited

FOREIGN PATENT DOCUMENTS

| | | |
|---|---|---|
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014150856 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015070105 A1 | 5/2015 |

OTHER PUBLICATIONS

US 8,964,053, 02/2015, Venkataraman et al. (withdrawn)
US 8,965,058, 02/2015, Venkataraman et al. (withdrawn)
Extended European Search Report for European Application EP12804266.0, Report Completed Jan. 27, 2015, Mailed Feb. 3, 2015, 6 Pgs.
Extended European Search Report for European Application EP12835041.0, Report Completed Jan. 28, 2015, Mailed Feb. 4, 2015, 6 Pgs.
International Preliminary Report on Patentability for International Application PCT/US2013/039155, report completed Nov. 4, 2014, Mailed Nov. 13, 2014, 10 Pgs.
International Preliminary Report on Patentability for International Application PCT/US2013/048772, Report completed Dec. 31, 2014, Mailed Jan. 8, 2015, 8 Pgs.
International Search Report and Written Opinion for International Application PCT/US14/17766, report completed May 28, 2014, 9 Pgs.
International Search Report and Written Opinion for International Application No. PCT/US2013/039155, Search completed Jul. 1, 2013, Mailed Jul. 11, 2013, 11 Pgs.
Zhang, Qiang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zhang et al., "A Self-Reconfigurable Camera Array", Eurographics Symposium on Rendering, 2004, 12 pgs.
US 8,957,977, 02/2015, Venkataraman et al. (withdrawn)
US 9,014,491, 04/2015, Venkataraman et al. (withdrawn)
International Preliminary Report on Patentability for International Application No. PCT/US2013/059991, Report Issued Mar. 17, 2015, Mailed Mar. 26, 2015, 8 pgs.
International Preliminary Report on Patentability for International Application No. PCT/US2014/023762, Report issued Mar. 2, 2015, Mailed Mar. 9, 2015, 10 Pgs.
International Search Report and Written Opinion for International Application No. PCT/US2014/066229, Search Completed Mar. 6, 2015, Mailed Mar. 19, 2015, 9 Pgs.
International Preliminary Report on Patentability for International Application No. PCT/US2013/056065, Report Issued Feb. 24, 2015, Mailed Mar. 5, 2015, 4 Pgs.
International Preliminary Report on Patentability for International Application No. PCT/US2013/056502, Report Issued Feb. 24, 2015, Mailed Mar. 5, 2015, 7 pgs.
International Preliminary Report on Patentability for International Application No. PCT/US2013/062720, Report Issued Mar. 31, 2015, Mailed Apr. 9, 2015, 8 pgs.
International Search Report and Written Opinion for International Application No. PCT/US2014/06493, Report Completed Mar. 3, 2015, Mailed Apr. 2, 2015, 15 pgs.
International Search Report and Written Opinion for International Application No. PCT/US13/46002, Search Completed Nov. 13, 2013, Mailed Nov. 29, 2013, 7 pgs.
International Search Report and Written Opinion for International Application No. PCT/US13/48772, Search Completed Oct. 21, 2013, Mailed Nov. 8, 2013, 6 pgs.
International Search Report and Written Opinion for International Application No. PCT/US13/56065, Search Completed Nov. 25, 2013, Mailed Nov. 26, 2013, 8 pgs.
International Search Report and Written Opinion for International Application No. PCT/US13/59991, Search Completed Feb. 6, 2014, Mailed Feb. 26, 2014, 8 pgs.
International Search Report and Written Opinion for International Application No. PCT/US2013/024987, Search Completed Mar. 27, 2013, Mailed Apr. 15, 2013, 14 pgs.
International Search Report and Written Opinion for International Application No. PCT/US2013/056502, Search Completed Feb. 18, 2014, Mailed Mar. 19, 2014, 7 pgs.
International Search Report and Written Opinion for International Application No. PCT/US2013/069932, Search Completed Mar. 14, 2014, Mailed Apr. 14, 2014, 12 pgs.
IPRP for International Application No. PCT/US2012/059813, International Filing Date Oct. 11, 2012, Search Completed Apr. 15, 2014, 7 pgs.
International Search Report and Written Opinion for International Application PCT/US11/36349, mailed Aug. 22, 2011, 12 pgs.
International Search Report and Written Opinion for International Application No. PCT/US2011/64921, Report Completed Feb. 25, 2011, mailed Mar. 6, 2012, 17 pgs.
International Search Report and Written Opinion for International Application No. PCT/US2013/027146, completed Apr. 2, 2013, 12 pgs.
International Search Report and Written Opinion for International Application PCT/US14/18084, completed May 23, 2014, 12 pgs.
International Search Report and Written Opinion for International Application PCT/US2009/044687, completed Jan. 5, 2010, 13 pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, completed Dec. 17, 2012, 8 pgs.
International Search Report and Written Opinion for International Application PCT/US12/37670, Mailed Jul. 18, 2012, Search Completed Jul. 5, 2012, 9 pgs.
International Search Report and Written Opinion for International Application PCT/US2012/58093, completed Nov. 15, 2012, 12 pgs.
Office Action for U.S. Appl. No. 12/952,106, dated Aug. 16, 2012, 12 pgs.

(56) References Cited

OTHER PUBLICATIONS

Baker et al.,"Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200, 2011.
Bishop et al., "Light Field Superresolution", Retrieved from http://home.eps.hw.ac.uk/~sz73/ICCP09/LightFieldSuperresolution.pdf, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, date unknown, 21 pgs.
Boye et al., "Comparison of Subpixel Image Registration Algorithms", Proc. of SPIE-IS&T Electronic Imaging, vol. 7246, pp. 72460X-1-72460X-9.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", [online], Retrieved on Nov. 10, 2012. Retrieved from the Internet at URL:<http://citeseerx.ist.psu.edu/viewdoc/download?doi=10.1.1. 226.2643&rep=rep1 &type=pdf>, Title pg., abstract, table of contents, pp. 1-263 (269 total pages).
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, pgs. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 3005, vol. 44, No. 15, pp. 2949-2956.
Duparre et al., "Ultra-Thin Camera Based on Artificial Apposistion Compound Eyes", 10th Microoptics Conference, Sep. 1-3, 2004, 2 pgs.
Fanaswala, "Regularized Super-Resolution of Multi-View Images", Retrieved on Nov. 10, 2012. Retrieved from the Internet at URL:<http://www.site.uottawa.ca/-edubois/theses/Fanaswala_thesis.pdf>, 163 pgs., Aug. 2009.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., Optical System Design, 2nd Edition, SPIE Press, pp. 191-198.
Fischer et al., Optical System Design, 2nd Edition, SPIE Press, pp. 49-58.
Hamilton, "JPEG File Interchange Format, Version 1.02", Sep. 1, 1992, 9 pgs.

(56) References Cited

OTHER PUBLICATIONS

Hardie, "A Fast Image Super-Algorithm Using an Adaptive Wiener Filter", IEEE Transactions on Image Processing, Dec. 2007, vol. 16, No. 12, pp. 2953-2964.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Kang et al., "Handling Occlusions inn Dense Multi-View Stereo", Computer Vision and Pattern Recognition, 2001, vol. 1, pp. 1-103-1-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., CVPR 94, 8 pgs.
Lensvector, "How LensVector Autofocus Works", printed Nov. 2, 2012 from http://www.lensvector.com/overview.html, 1 pg.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution," Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html--11.html.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Shum et al., "Pop-Up Light Field: An Interactive Image-Based Modeling and Rendering System," Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer 77, 9 (Sept.), 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Marland, College Park—Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, Oct. 19, 2006, 1-5.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008.
Wang, "Calculation of Image Position, Size and Orientation Using First Order Properties", 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", http://en.wikipedia.org/wiki/Polarizing_filter_(photography), 1 pg.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 765-776.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera

(56) References Cited

OTHER PUBLICATIONS objective", Proceedings of SPIE, Optical Design and Engineering II, Oct. 15, 2005, 59622C-1-59622C-11.
Yang et al., "Superresolution Using Preconditioned Conjugate Gradient Method", Source and date unknown, 8 pgs.
Zomet et al., "Robust Super-Resolution", IEEE, 2001, pp. 1-6.
International Search Report and Written Opinion for International Application PCT/US 14/23762, Completed May 30, 2014, Mailed Jul. 3, 2014, 6 Pgs.
International Search Report and Written Opinion for International Application PCT/US14/18116, completed May 13, 2014, 12 pgs.
International Search Report and Written Opinion for International Application PCT/US14/22118, report completed Jun. 9, 2014, Mailed, Jun. 25, 2014, 5 pgs.
International Search Report and Written Opinion for International Application PCT/US14/24407, report completed Jun. 11, 2014, Mailed Jul. 8, 2014, 9 Pgs.
International Search Report and Written Opinion for International Application PCT/US14/22123, report completed Jun. 9, 2014, Mailed Jun. 25, 2014, 5 pgs.
International Search Report and Written Opinion for International Application PCT/US14/28447, report completed Jul. 21, 2014, Mailed Jul. 21, 2014, 8 Pgs.
International Search Report and Written Opinion for International Application PCT/US13/62720, International Filing Date Sep. 30, 2013, report completed Mar. 25, 2014, Mailed Apr. 21, 2014, 9 pages.
International Search Report and Written Opinion for International Application PCT/US14/25100, International Filing Date Mar. 12, 2014, report completed Jul. 7, 2014, Mailed Aug. 7, 2014 5 pages.
International Search Report and Written Opinion for International Application PCT/US2014/030692, International Filing Date Mar. 17, 2014, report completed Jul. 28, 2014, Mailed Aug. 27, 2014, 7 pages.
Chen et al., "Interactive deformation of light fields", in Proceedings of SIGGRAPH 13D 2005, pp. 139-146.
Goldman et al., "Video Object Annotation, Navigation, and Composition", in Proceedings of UIST 2008, pp. 3-12.
Gortler et al., "The Lumigraph", in Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Hasinoff et al., "Search-and-Replace Editing for Personal Photo Collections", Computational Photography (ICCP) 2010, pp. 1-8.
Horn et al., "LightShop: Interactive Light Field Manipulation and Rendering", in Proceedings of 13D 2007, pp. 121-128.
Isaksen et al., "Dynamically Reparameterized Light Fields", in Proceedings of SIGGRAPH 2000, pp. 297-306.
Jarabo et al., "Efficient Propagation of Light Field Edits", in Proceedings of SIACG 2011, pp. 75-80.
Lo et al., "Stereoscopic 3D Copy & Paste", ACM Transactions on Graphics, vol. 29, No. 6, Article 147, Dec. 2010, pp. 147:1-147:10.
Neel, Joshi et al., "Synthetic Aperture Tracking: Tracking Through Occlusions", ICCV IEEE 11th International Conference on Computer Vision, Oct. 2007, Retrieved from <URL: http:l/ieeexplore.ieee.org/stamp/stamp.jsp?tp=&arnumber=4409032&isnumber=4408819>, Jul. 28, 2014, pp. 1-8.
Seitz et al., "Plenoptic Image Editing", International Journal of Computer Vision 48, 2, pp. 115-129.
Lee et al., "Electroactive Polymer Actuator for Lens-Drive Unit in Auto-Focus Compact Camera Module", ETRI Journal, vol. 31, No. 6, Dec. 2009, pp. 695-702.
Levin et al., "A Closed Form Solution to Natural Image Matting", Pattern Analysis and Machine Intelligence, Feb. 2008, vol. 30, 8 pgs.
Merkle, Philipp et al., "Adaptation and optimization of coding algorithms for mobile 3DTV", Mobile3DTV Project No. 216503, Nov. 2008, 55 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer, Francese et al., "Active Refocusing of Images and Videos", ACM SIGGRAPH, 2007, vol. 26, pp. 1-10, Retrieved on Jul. 8, 2015, Retrieved from the Internet <URL:http://doi.acm.org/10.1145/1276377.1276461>.
Perwass et al., "Single Lens 3D-Camera with Extended Depth-of-Field", printed from www.raytrix.de, Jan. 2012, 15 pgs.
Philips 3D Solutions, "3D Interface Specifications, White Paper", Philips 3D Solutions retrieved from www.philips.com/3dsolutions, Feb. 15, 2008, 29 pgs.
Pouydebasquea et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Rajan, Deepu et al., "Simultaneous Estimation of Super Resolved Scene and Depth Map from Low Resolution Defocused Observations", IEEE Computer Society, vol. 25, No. 9; Sep. 2003; pp. 1-16.
Tallon et al., "Upsampling and Denoising of Depth Maps Via Joint-Segmentation", 20th European Signal Processing Conference, Aug. 27-31, 2012, 5 pgs.
Yang et al., "A Real-Time Distributed Light Field Camera", Eurographics Workshop on Rendering (2002), pp. 1-10.
US 9,338,332, 05/2016, Venkataraman et al. (withdrawn)
Extended European Search Report for European Application EP12782935.6, report completed Aug. 28, 2014 Mailed Sep. 4, 2014, 6 Pgs.
Extended European Search Report for European Application EP13810229.8, Report Completed Apr. 14, 2016, Mailed Apr. 21, 2016, 7 Pgs.
International Preliminary Report on Patentability for International Application PCT/US2013/024987, Mailed Aug 21, 2014, 13 Pgs.
International Preliminary Report on Patentability for International Application PCT/US2013/027146, International Filing Date Feb. 21, 2013, Report Completed Apr. 2, 2013, 10 Pgs.
International Preliminary Report on Patentability for International Application PCT/US2013/046002, Report issued Dec. 31, 2014, Mailed Jan. 8, 2015, 6 Pgs.
International Preliminary Report on Patentability for International Application PCT/US2013/069932, Report issued May 19, 2015, Mailed May 28, 2015, 12 Pgs.
International Preliminary Report on Patentability for International Application PCT/US2014/018084, Report issued Aug. 25, 2015, Mailed Sep. 3, 2015, 11 Pgs.
International Preliminary Report on Patentability for International Application PCT/US2014/018116, Report issued Sep. 15, 2015, Mailed Sep. 24, 2015, 12 Pgs.
International Preliminary Report on Patentability for International Application PCT/US2014/022118, Report issued Sep. 8, 2015, Mailed Sep. 17, 2015, 4 Pgs.
International Preliminary Report on Patentability for International Application PCT/US2014/022123, Report issued Sep. 8, 2015, Mailed Sep. 17, 2015, 4 Pgs.
International Preliminary Report on Patentability for International Application PCT/US2014/024407, Report issued Sep. 15, 2015, Mailed Sep. 24, 2015, 8 Pgs.
International Preliminary Report on Patentability for International Application PCT/US2014/025100, Report issued Sep. 15, 2015, Mailed Sep. 24, 2015, 4 Pgs.
International Preliminary Report on Patentability for International Application PCT/US2014/028447, Report issued Sep. 15, 2015, Mailed Sep. 24, 2015, 7 Pgs.
International Search Report and Written Opinion for International Application PCT/US14/024903 report completed Jun. 12, 2014, Mailed, Jun. 27, 2014, 13 pgs.
International Search Report and Written Opinion for International Application PCT/US14/22774 report completed Jun. 9, 2014, Mailed Jul. 14, 2014, 6 Pgs.

(56) References Cited

OTHER PUBLICATIONS

International Search Report and Written Opinion for International Application PCT/US14/25904 report completed Jun. 10, 2014, Mailed Jul. 10, 2014, 6 Pgs.
International Search Report and Written Opinion for International Application PCT/US2014/024947, Report Completed Jul. 8, 2014, Mailed Aug 5, 2014, 8 Pgs.
International Search Report and Written Opinion for International Application PCT/US2014/067740, Report Completed Jan 29, 2015, Mailed Mar. 3 2015, 10 pgs.
Chan et al., "Super-resolution reconstruction in a computational compound-eye imaging system", Multidim Syst Sign Process, 2007, vol. 18, pp. 83-101.
Chen et al., "KNN Matting", IEEE Transactions on Pattern Analysis and Machine Intelligence, Sep. 2013, vol. 35, No. 9, pp. 2175-218.
Lai et al., "A Large-Scale Hierarchical Multi-View RGB-D Object Dataset", May 2011, 8 pgs.
Zheng et al., "Balloon Motion Estimation Using Two Frames", Proceedings of the Asilomar Conference on Signals, Systems and Computers, IEEE, Comp. Soc. Press, US, vol. 2 of 02, Nov. 4, 1991, pp. 1057-1061.
European Search Report for European Application No. 13830945.5, Search completed Jun. 28, 2016, Mailed Jul. 7, 2016, 14 Pgs.
European Search Report for European Application No. 13841613.6, Search completed Jul. 18, 2016, Mailed Jul. 26, 2016, 8 Pgs.
International Preliminary Report on Patentability for International Application PCT/US2014/064693, Report issued May 10, 2016, Mailed May 19, 2016, 14 Pgs.
International Preliminary Report on Patentability for International Application PCT/US2014/066229, Report issued May 24, 2016, Mailed Jun. 6, 2016, 8 Pgs.
Supplementary European Search Report for EP Application No. 13831768.0, Search completed May 18, 2016, Mailed May 30, 2016, 13 Pgs.

* cited by examiner

EXTENDED COLOR PROCESSING ON PELICAN ARRAY CAMERAS

CROSS-REFERENCE TO RELATED APPLICATIONS

The current application claims priority to U.S. Application No. 61/798,602 entitled "Extended Color Processing on Pelican Array Cameras," filed Mar. 15, 2013, the disclosure of which is incorporated herein by reference.

FIELD OF THE INVENTION

The present invention generally relates to imaging and more specifically relates to array cameras that utilize cross-channel fusion and extended color processing.

BACKGROUND OF THE INVENTION

In a typical imaging device, light enters through an opening (aperture) at one end of the imaging device and is directed to an image sensor by one or more optical elements such as lenses. The image sensor consists of pixels that generate signals upon receiving light via the optical element. Commonly used image sensors include charge-coupled device image sensors (CCDs) and complementary metal-oxide semiconductor (CMOS) sensors.

Conventional digital cameras typically achieve color separation by performing color separation in the optical path and using a separate image sensor for the wavelengths of light corresponding to each of the primary colors (i.e. RGB), using an image sensor with color separation and multiple signal collection capability within each pixel, or by applying filters over a single sensor so that individual pixels detect wavelengths of light corresponding to one of the primary colors. Use of filters is particularly common in cameras that have a small form factor, such as cameras incorporated in mobile phone handsets and other consumer electronics devices including but not limited to, laptop computers and televisions. A common filter that is formed on image sensors is the Bayer filter, the pattern of which includes 50% green filters, 25% red filters, and 25% blue filters. The output of an image sensor to which a Bayer filter is applied can be reconstructed as a color image using interpolation techniques.

Image sensors are subject to various performance constraints including, among others, dynamic range, signal to noise (SNR) ratio and low light sensitivity. The dynamic range is defined as the ratio of the maximum possible signal that can be captured by a pixel to the total noise signal. The SNR of a captured image is, to a great extent, a measure of image quality. In general, as more light is captured by the pixel, the higher the SNR. The light sensitivity of an image sensor is typically determined by the intensity of light incident upon the sensor pixels. At low light levels, each pixel's light gathering capability is constrained by the low signal levels incident upon each pixel.

A challenge associated with increasing the number of pixels in an image sensor is that the lens system is dimensioned to span the image sensor. The problem is most acute with mobile cameras, such as those used in mobile phones and consumer electronics devices, where the form factor of the lens system can significantly impact the overall form factor of the mobile device.

In response to the constraints placed upon a traditional digital camera based upon the camera obscura, a new class of cameras that can be referred to as array cameras have been proposed. Array cameras are characterized in that they include multiple arrays of pixels, each having a separate lens system. Examples of 2, 3 and 4 array cameras in which each array of pixels captures light from a different band of the visible spectrum and the captured images are combined to create a full color image is disclosed in U.S. Pat. No. 7,199,348 to Olsen et al., the disclosure of which is incorporated by reference herein in its entirety. U.S. Pat. No. 7,262,799 to Suda, the disclosure of which is incorporated herein by reference in its entirety, discloses a 2×2 array camera including one sensor used to sense a red (R) image signal, one sensor used to sense a blue (B) image signal and, two sensors used to sense green (G) image signals.

SUMMARY OF THE INVENTION

Systems and methods for extended color processing on Pelican array cameras in accordance with embodiments of the invention are disclosed. In one embodiment, a method of generating a high resolution image of a scene using an imager array including a plurality of imagers that each capture an image of the scene, and a forward imaging transformation for each imager includes obtaining input images captured by a plurality of imagers, where a first set of input images includes image information captured in a first band of visible wavelengths and a second set of input images includes image information captured in a second band of visible wavelengths and non-visible wavelengths, determining an initial estimate of at least a portion of a high resolution image using a processor configured by software to combine image information from the first set of input images into a first fused image, combine image information from the second set of input images into a second fused image, spatially register the first fused image and the second fused image, denoise the first fused image using a first bilateral filter, denoise the second fused image using a second bilateral filter, normalize the second fused image in the photometric reference space of the first fused image, and combine the first fused image and the second fused image into an initial estimate of at least a portion of the high resolution image, determining a high resolution image that when mapped through the forward imaging transformation matches the input images to within at least one predetermined criterion using the initial estimate of at least a portion of the high resolution image using the processor configured by software, where each forward imaging transformation corresponds to the manner in which each imager in the imaging array generated the input images, and where the high resolution image has a resolution that is greater than any of the input images.

In a further embodiment, the first band of visible wavelengths and the second band of visible and non-visible wavelengths have some degree of overlap.

In another embodiment, the second band of visible and non-visible wavelengths includes green, red, and near-infrared light.

In a still further embodiment, the first fused image and the second fused image have the same resolution and the resolution is higher than the resolution of any of the input images.

In still another embodiment, the first set of input images are captured by a first set of imagers from the plurality of imagers and the first set of imagers are sensitive to light in the first band of visible wavelengths, and the second set of input images are captured by a second set of imagers from the plurality of imagers and the second set of imagers are sensitive to light in the second band of visible and non-visible wavelengths.

In a yet further embodiment, the processor being configured to combine image information from the first set of input images into a first fused image utilizes analog gain and noise information from the first set of imagers and the processor being configured to combine image information from the second set of input images into a second fused image utilizes analog gain and noise information from the second set of imagers.

In yet another embodiment, the first bilateral filter and the second bilateral filter utilize weights that are a function of both the photometric and geometric distance between a pixel and pixels in the neighborhood of the pixel.

In a further embodiment again, the first bilateral filter is a cross-channel bilateral filter utilizing weights determined for the second image.

In another embodiment again, the first set of input images are captured by a first set of imagers from the plurality of imagers and the first bilateral filter is a cross-channel bilateral filter utilizing weights determined for the second image when an analog gain value of the first set of imagers is above a predetermined threshold.

In a further additional embodiment, normalizing the second fused image in the photometric reference space of the first fused image includes applying gains and offsets to pixels of the second fused image.

In another additional embodiment, the gain for each pixel of the second fused image is determined by the equation:

$$\hat{a} = \frac{\left[\sum_r \sum_c g(r,c) \cdot e(r,c)\right] - N_r N_c \bar{g} \cdot \bar{e}}{\left[\sum_r \sum_c e^2(r,c)\right] - N_r N_c \bar{e}^2},$$

and the bias for each pixel of the second fused image is determined by the equation:

$\hat{b} = \bar{g} - \hat{a} \cdot \bar{e}$ where:

$$\bar{e} = \frac{1}{N_r N_c} \sum_r \sum_c e(r,c),$$

$$\bar{g} = \frac{1}{N_r N_c} \sum_r \sum_c g(r,c),$$

e is the second fused image, g is the first fused image, $N_r$ and $N_c$ are the number of pixels horizontally and vertically of the neighborhood of pixels around the pixel, and r and c are row and column indices into the images within the bounds defined by $N_r$ and $N_c$.

In a still yet further embodiment, determining an initial estimate of at least a portion of a high resolution image using a processor configured by software also includes the processor being configured to cross-channel normalize the first fused image in the photometric reference space of the second fused image.

In still yet another embodiment, the processor being configured to cross-channel normalize the first fused image in the photometric reference space of the second fused image includes the processor being configured to apply gains and offsets to pixels of the first fused image.

In a still further embodiment again, the gain for each pixel of the first fused image is determined by the equation:

$$\hat{a} = \frac{\left[\sum_r \sum_c g(r,c) \cdot e(r,c)\right] - N_r N_c \bar{g} \cdot \bar{e}}{\left[\sum_r \sum_c e^2(r,c)\right] - N_r N_c \bar{e}^2},$$

and the bias for each pixel of the first fused image is determined by the equation:

$\hat{b} = \bar{g} - \hat{a} \cdot \bar{e}$ where:

$$\bar{e} = \frac{1}{N_r N_c} \sum_r \sum_c e(r,c),$$

$$\bar{g} = \frac{1}{N_r N_c} \sum_r \sum_c g(r,c),$$

e is the first fused image, g is the second fused image, $N_r$ and $N_c$ are the number of pixels horizontally and vertically of the neighborhood of pixels around the pixel, and r and c are row and column indices into the images within the bounds defined by $N_r$ and $N_c$.

In still another embodiment again, the processor being configured to normalize the second fused image in the photometric reference space of the first fused image includes the processor being configured to select a first pixel of interest in the second fused image and a first collection of similar pixels in the neighborhood of the first pixel of interest, select a second pixel of interest in the first fused image corresponding to the first pixel of interest and a second collection of similar pixels in the neighborhood of the second pixel of interest, determine the intersection of the first collection of similar pixels and the second collection of similar pixels, calculate gain and offset values using the intersection of the two collections, apply the gain and offset values to the appropriate pixels in the second fused image.

In a still further additional embodiment, the intersection of the first collection of similar pixels and the second collection of similar pixels is the set of pixels in the first and second collections having the same corresponding locations in each of the first and second fused images.

In still another additional embodiment, the gain for each pixel in the intersection of the two collections within the second fused image is determined by the equation:

$$\hat{a} = \frac{\left[\sum_r \sum_c g(r,c) \cdot e(r,c)\right] - N_r N_c \bar{g} \cdot \bar{e}}{\left[\sum_r \sum_c e^2(r,c)\right] - N_r N_c \bar{e}^2},$$

and the bias for each pixel in the intersection of the two collections within the second fused image is determined by the equation:

$\hat{b} = \bar{g} - \hat{a} \cdot \bar{e}$ where:

$$\bar{e} = \frac{1}{N_r N_c} \sum_r \sum_c e(r,c),$$

$$\overline{g} = \frac{1}{N_r N_c} \sum_r \sum_c g(r, c),$$

e is the second fused image, g is the first fused image, $N_r$ and $N_c$ are the number of pixels horizontally and vertically of the neighborhood of pixels around the pixel, and r and c are row and column indices into the images within the bounds defined by $N_r$ and $N_c$.

In a yet further embodiment again, an array camera configured to generate a high resolution image of a scene using an imager array including a plurality of imagers that each capture an image of the scene, and a forward imaging transformation for each imager, includes an imager array including a plurality of imagers, and a processor configured by software to obtain input images captured by the plurality of imagers, where a first set of input images includes image information captured in a first band of visible wavelengths and a second set of input images includes image information captured in a second band of visible wavelengths and non-visible wavelengths, determine an initial estimate of at least a portion of a high resolution image by combining image information from the first set of input images into a first fused image, combining image information from the second set of input images into a second fused image, spatially registering the first fused image and the second fused image, denoising the first fused image using a first bilateral filter, denoising the second fused image using a second bilateral filter, normalizing the second fused image in the photometric reference space of the first fused image, combining the first fused image and the second fused image into an initial estimate of at least a portion of the high resolution image, determine a high resolution image that when mapped through the forward imaging transformation matches the input images to within at least one predetermined criterion using the initial estimate of at least a portion of the high resolution image using the processor configured by software, where each forward imaging transformation corresponds to the manner in which each imager in the imaging array generated the input images, and where the high resolution image has a resolution that is greater than any of the input images.

In yet another embodiment again, the first band of visible wavelengths and the second band of visible and non-visible wavelengths have some degree of overlap.

In a yet further additional embodiment, the second band of visible and non-visible wavelengths includes green, red, and near-infrared light.

In yet another additional embodiment, the first fused image and the second fused image have the same resolution and the resolution is higher than the resolution of any of the input images.

In a further additional embodiment again, the first set of input images are captured by a first set of imagers from the plurality of imagers and the first set of imagers are sensitive to light in the first band of visible wavelengths, and the second set of input images are captured by a second set of imagers from the plurality of imagers and the second set of imagers are sensitive to light in the second band of visible and non-visible wavelengths.

In another additional embodiment again, combining image information from the first set of input images into a first fused image utilizes analog gain and noise information from the first set of imagers and combining image information from the second set of input images into a second fused image utilizes analog gain and noise information from the second set of imagers.

In a still yet further embodiment again, the first bilateral filter and the second bilateral filter utilize weights that are a function of both the photometric and geometric distance between a pixel and pixels in the neighborhood of the pixel.

In still yet another embodiment again, the first bilateral filter is a cross-channel bilateral filter utilizing weights determined for the second image.

In a still yet further additional embodiment, the first set of input images are captured by a first set of imagers from the plurality of imagers and the first bilateral filter is a cross-channel bilateral filter utilizing weights determined for the second image when an analog gain value of the first set of imagers is above a predetermined threshold.

In still yet another additional embodiment, normalizing the second fused image in the photometric reference space of the first fused image includes applying gains and offsets to pixels of the second fused image.

In a yet further additional embodiment again, the gain for each pixel of the second fused image is determined by the equation:

$$\hat{a} = \frac{\left[\sum_r \sum_c g(r,c) \cdot e(r,c)\right] - N_r N_c \overline{g} \cdot \overline{e}}{\left[\sum_r \sum_c e^2(r,c)\right] - N_r N_c \overline{e}^2},$$

and the bias for each pixel of the second fused image is determined by the equation:

$$\hat{b} = \overline{g} - \hat{a} \cdot \overline{e}$$

where:

$$\overline{e} = \frac{1}{N_r N_c} \sum_r \sum_c e(r, c),$$

$$\overline{g} = \frac{1}{N_r N_c} \sum_r \sum_c g(r, c),$$

e is the second fused image, g is the first fused image, $N_r$ and $N_c$ are the number of pixels horizontally and vertically of the neighborhood of pixels around the pixel, and r and c are row and column indices into the images within the bounds defined by $N_r$ and $N_c$.

In yet another additional embodiment again, the processor is also configured to cross-channel normalize the first fused image in the photometric reference space of the second fused image.

In a still yet further additional embodiment again, the processor being configured to cross-channel normalize the first fused image in the photometric reference space of the second fused image includes the processor being configured to apply gains and offsets to pixels of the first fused image.

In still yet another additional embodiment again, the gain for each pixel of the first fused image is determined by the equation:

$$\hat{a} = \frac{\left[\sum_r \sum_c g(r,c) \cdot e(r,c)\right] - N_r N_c \overline{g} \cdot \overline{e}}{\left[\sum_r \sum_c e^2(r,c)\right] - N_r N_c \overline{e}^2},$$

and the bias for each pixel of the first fused image is determined by the equation:

$$\hat{b} = \overline{g} - \hat{a} \cdot \overline{e}$$

where:

$$\overline{e} = \frac{1}{N_r N_c} \sum_r \sum_c e(r, c),$$

$$\overline{g} = \frac{1}{N_r N_c} \sum_r \sum_c g(r, c),$$

e is the first fused image, g is the second fused image, $N_r$ and $N_c$ are the number of pixels horizontally and vertically of the neighborhood of pixels around the pixel, and r and c are row and column indices into the images within the bounds defined by $N_r$ and $N_c$.

In another further embodiment, normalizing the second fused image in the photometric reference space of the first fused image includes selecting a first pixel of interest in the second fused image and a first collection of similar pixels in the neighborhood of the first pixel of interest, selecting a second pixel of interest in the first fused image corresponding to the first pixel of interest and a second collection of similar pixels in the neighborhood of the second pixel of interest, determining the intersection of the first collection of similar pixels and the second collection of similar pixels, calculating gain and offset values using the intersection of the two collections, applying the gain and offset values to the appropriate pixels in the second fused image.

In still another further embodiment, the intersection of the first collection of similar pixels and the second collection of similar pixels is the set of pixels in the first and second collections having the same corresponding locations in each of the first and second fused images.

In yet another further embodiment, the gain for each pixel in the intersection of the two collections within the second fused image is determined by the equation:

$$\hat{a} = \frac{\left[\sum_r \sum_c g(r,c) \cdot e(r,c)\right] - N_r N_c \overline{g} \cdot \overline{e}}{\left[\sum_r \sum_c e^2(r,c)\right] - N_r N_c \overline{e}^2},$$

and the bias for each pixel in the intersection of the two collections within the second fused image is determined by the equation:

$$\hat{b} = \overline{g} - \hat{a} \cdot \overline{e}$$

where:

$$\overline{e} = \frac{1}{N_r N_c} \sum_r \sum_c e(r, c),$$

$$\overline{g} = \frac{1}{N_r N_c} \sum_r \sum_c g(r, c),$$

e is the second fused image, g is the first fused image, $N_r$ and $N_c$ are the number of pixels horizontally and vertically of the neighborhood of pixels around the pixel, and r and c are row and column indices into the images within the bounds defined by $N_r$ and $N_c$.

DETAILED DISCLOSURE OF THE INVENTION

Figure 1:
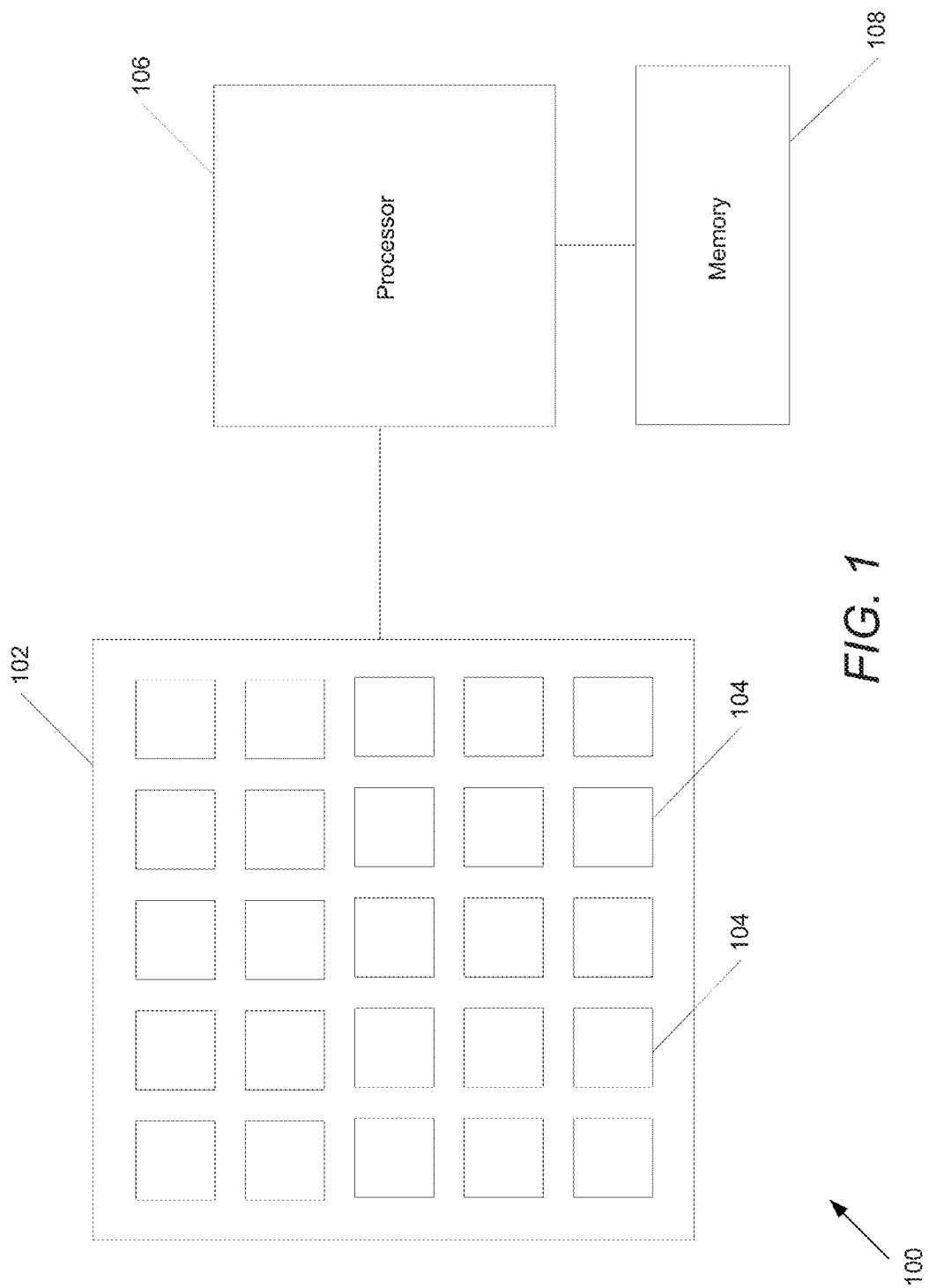
FIG. 1 is a block diagram of an array camera in accordance with an embodiment of the invention.

Turning now to the drawings, systems and methods for utilizing extended color processing on image data captured by an array camera in accordance with embodiments of the invention are illustrated. Array cameras including camera modules that can be utilized to capture image data from different viewpoints (i.e. light field images) are disclosed in U.S. patent application Ser. No. 12/935,504 entitled "Capturing and Processing of Images using Monolithic Camera Array with Heterogeneous Imagers" to Venkataraman et al. In many instances, fusion and super-resolution processes such as those described in U.S. patent application Ser. No. 12/967,807 entitled "Systems and Methods for Synthesizing High Resolution Images Using Super-Resolution Processes" to Lelescu et al., can be utilized to synthesize a higher resolution (HR) 2D image or a stereo pair of higher resolution 2D images from the lower resolution (LR) images in the light field captured by an array camera. The terms high or higher resolution (HR) and low or lower resolution (LR) are used here in a relative sense and not to indicate the specific resolutions of the images captured by the array camera. The disclosures of U.S. patent application Ser. Nos. 12/935,504 and 12/967,807 are hereby incorporated by reference in their entirety.

Each two-dimensional (2D) image in a captured light field is from the viewpoint of one of the cameras in the array camera. Due to the different viewpoint of each of the cameras, parallax results in variations in the position of foreground objects within the images of the scene. Processes such as those disclosed in U.S. Provisional Patent Application No. 61/691,666 entitled "Systems and Methods for Parallax Detection and Correction in Imaged Captured Using Array Cameras" to Venkataraman et al. can be utilized to provide an accurate account of the pixel disparity as a result of parallax between the different cameras in an array. The disclosure of U.S. Patent Application Ser. No. 61/691,666 is hereby incorporated by reference in its entirety. Array cameras can use disparity between pixels in images within a light field to generate a depth map from a reference viewpoint. A depth map indicates the distance of the surfaces of scene objects from the reference viewpoint and can be utilized to determine scene dependent geometric corrections to apply to the pixels from each of the images within a captured light field to eliminate disparity when performing fusion and/or super-resolution processing.

In a number of embodiments, cross-channel fusion of a visible imaging channel and a non-visible imaging channel can be used to generate source images for a super-resolution (SR) process such as the processes described in U.S. patent application Ser. No. 12/967,807. In many embodiments, a visible channel image is fused with an extended color channel image. An extended-color channel is a channel that is designed to overlap spectrally with the visible channel spectrum. Because an extended-color channel is typically highly correlated with the visible channel with which it overlaps, fusing an extended-color image with a visible channel image can provide many advantages in SR and other image processing as will be discussed further below. Systems and methods for synthesizing images from image data captured by array cameras using cross-channel fusion and utilizing extended color processing in accordance with embodiments of the invention are discussed further below.

Array Cameras

Array cameras in accordance with embodiments of the invention can include a camera module including an array of cameras and a processor configured to read out and process image data from the camera module to synthesize images. An array camera in accordance with an embodiment of the invention is illustrated in FIG. 1. The array camera 100 includes a camera module 102 with an array of individual cameras 104 where an array of individual cameras refers to a plurality of cameras in a particular arrangement, such as (but not limited to) the square arrangement utilized in the illustrated embodiment. The camera module 102 is connected to the processor 106. The processor is also configured to communicate with one or more different types of memory 108 that can be utilized to store image data and/or contain machine readable instructions utilized to configure the processor to perform processes including (but not limited to) the various processes described below.

Processors 106 in accordance with many embodiments of the invention are configured using appropriate software to take the image data within the light field and synthesize one or more high resolution images. In several embodiments, the high resolution image is synthesized from a reference viewpoint, typically that of a reference focal plane 104 within the sensor 102. In many embodiments, the processor is able to synthesize an image from a virtual viewpoint, which does not correspond to the viewpoints of any of the focal planes 104 in the sensor 102. Unless all of the objects within a captured scene are a significant distance from the array camera, the images in the light field will include disparity due to the different fields of view of the focal planes used to capture the images. Processes for detecting and correcting for disparity are discussed further below. Although a specific array camera architecture is illustrated in FIG. 1, alternative architectures can also be utilized in accordance with embodiments of the invention.

Array Camera Modules

Array camera modules in accordance with embodiments of the invention can be constructed from an imager array or sensor including an array of focal planes and an optic array including a lens stack for each focal plane in the imager array. Sensors including multiple focal planes are discussed in U.S. patent application Ser. No. 13/106,797 entitled "Architectures for System on Chip Array Cameras", to Pain et al., the disclosure of which is incorporated herein by reference in its entirety. Light filters can be used within each optical channel formed by the lens stacks in the optic array to enable different cameras within an array camera module to capture image data with respect to different portions of the electromagnetic spectrum.

Figure 1A:
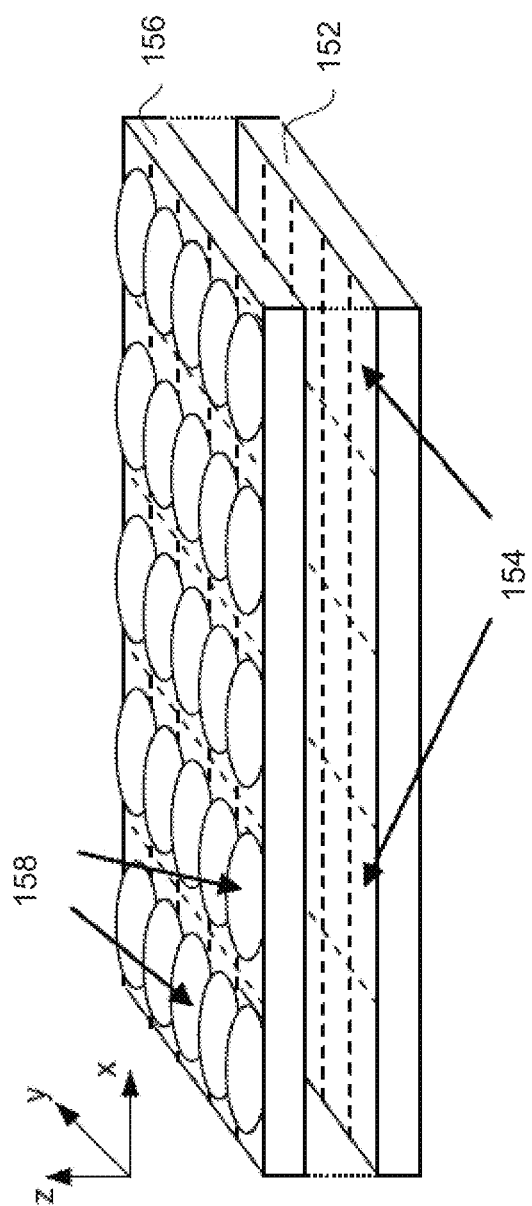
FIG. 1A conceptually illustrates an optic array and an imager array in an array camera module in accordance with an embodiment of the invention.

An array camera module in accordance with an embodiment of the invention is illustrated in FIG. 1A. The array camera module 150 includes an imager array 152 including an array of focal planes 154 along with a corresponding optic array 156 including an array of lens stacks 158. Within the array of lens stacks, each lens stack 158 creates an optical channel that forms an image of the scene on an array of light sensitive pixels within a corresponding focal plane 154. Each pairing of a lens stack 158 and focal plane 154 forms a single camera 104 within the camera module. Each pixel within a focal plane 154 of a camera 104 generates image data that can be sent from the camera 104 to the processor 106. In many embodiments, the lens stack within each optical channel is configured so that pixels of each focal plane 154 sample the same object space or region within the scene. In several embodiments, the lens stacks are configured so that the pixels that sample the same object space do so with sub-pixel offsets to provide sampling diversity that can be utilized to recover increased resolution through the use of super-resolution processes.

In the illustrated embodiment, the focal planes are configured in a 5×5 array. Each focal plane 154 on the sensor is capable of capturing an image of the scene. Typically, each focal plane includes a plurality of rows of pixels that also forms a plurality of columns of pixels, and each focal plane is contained within a region of the imager that does not contain pixels from another focal plane. In many embodiments, image data capture and readout of each focal plane can be independently controlled. In this way, image capture settings including (but not limited to) the exposure times and analog gains of pixels within a focal can be determined independently to enable image capture settings to be tailored based upon factors including (but not limited to) a specific color channel and/or a specific portion of the scene dynamic range. The sensor elements utilized in the focal planes can be individual light sensing elements such as, but not limited to, traditional CIS (CMOS Image Sensor) pixels, CCD (charge-coupled device) pixels, high dynamic range sensor elements, multispectral sensor elements and/or any other structure configured to generate an electrical signal indicative of light incident on the structure. In many embodiments, the sensor elements of each focal plane have similar physical properties and receive light via the same optical channel and color filter (where present). In other embodiments, the sensor elements have different characteristics and, in many instances, the characteristics of the sensor elements are related to the color filter applied to each sensor element.

In several embodiments, color filters in individual cameras can be used to pattern the camera module with π filter groups as further discussed in U.S. Provisional Patent Application No. 61/641,165 entitled "Camera Modules Patterned with pi Filter Groups" filed May 1, 2012, the disclosure of which is incorporated by reference herein in its entirety. These cameras can be used to capture data with respect to different colors, or a specific portion of the spectrum. In contrast to applying color filters to the pixels of the camera, color filters in many embodiments of the invention are included in the lens stack. For example, a Green color camera can include a lens stack with a Green light filter that allows Green light to pass through the optical channel. A near-IR camera can include a lens stack with a near-IR light filter that allows near-IR light to pass through the optical channel.

In many embodiments, the pixels in each focal plane are the same and the light information captured by the pixels is differentiated by the color filters in the corresponding lens stack for each filter plane. Although a specific construction of a camera module with an optic array including color filters in the lens stacks is described above, camera modules including π filter groups can be implemented in a variety of ways including (but not limited to) by applying color filters to the pixels of the focal planes of the camera module similar to the manner in which color filters are applied to the pixels of a conventional color camera. In several embodiments, at least one of the cameras in the camera module can include uniform color filters applied to the pixels in its focal plane. In many embodiments, a Bayer filter pattern is applied to the pixels of one of the cameras in a camera module. In a number of embodiments, camera modules are constructed in which color filters are utilized in both the lens stacks and on the pixels of the imager array.

Although specific array cameras and imager arrays are discussed above, many different array cameras can be utilized to capture image data and synthesize images using multi-resolution depth maps as appropriate to the requirements of specific applications in accordance with embodiments of the invention. Imager arrays in accordance with embodiments of the invention are discussed further below.

Imager Array Configurations

Figure 2A:
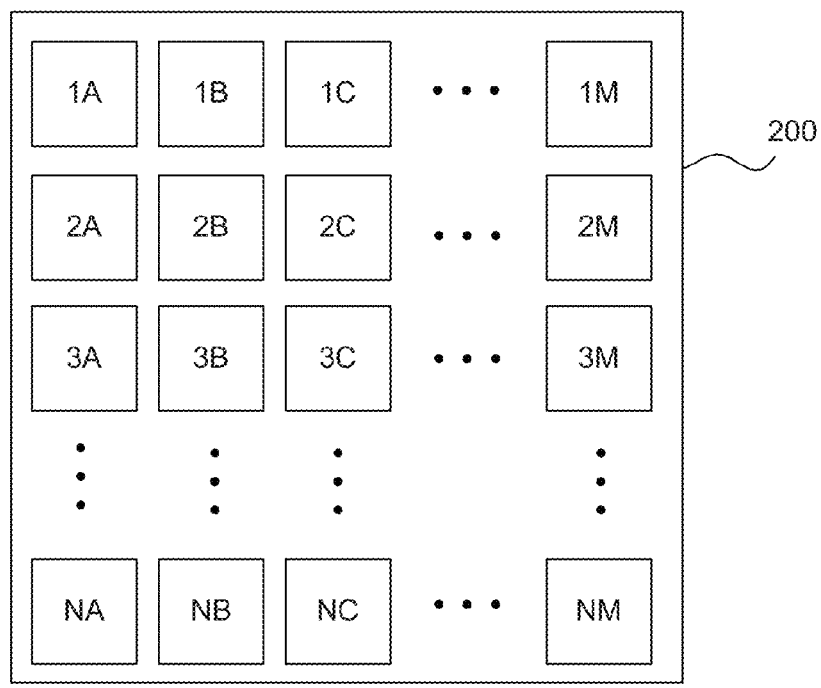
FIGS. 2A-2D illustrate imager configurations of imager arrays in accordance with embodiments of the invention.

An imager array can include any N×M array of imagers such as the imager array (200) illustrated in FIG. 2A. In several embodiments, the array is square. In other embodiments, the array is rectangular. In a number of embodiments, the array can also be irregular. Each of the imagers typically includes its own filter and/or optical elements and can image different wavelengths of light. In a number of embodiments, the imager array includes imagers that sense red light (R), imagers that sense green light (G), and imagers that sense blue light (B). The human eye is more sensitive to green light than to red and blue light; therefore, an increase in the resolution of a synthesized image can be achieved using an array that includes more imagers that sense green light than imagers that sense red or blue light.

Figure 2B:
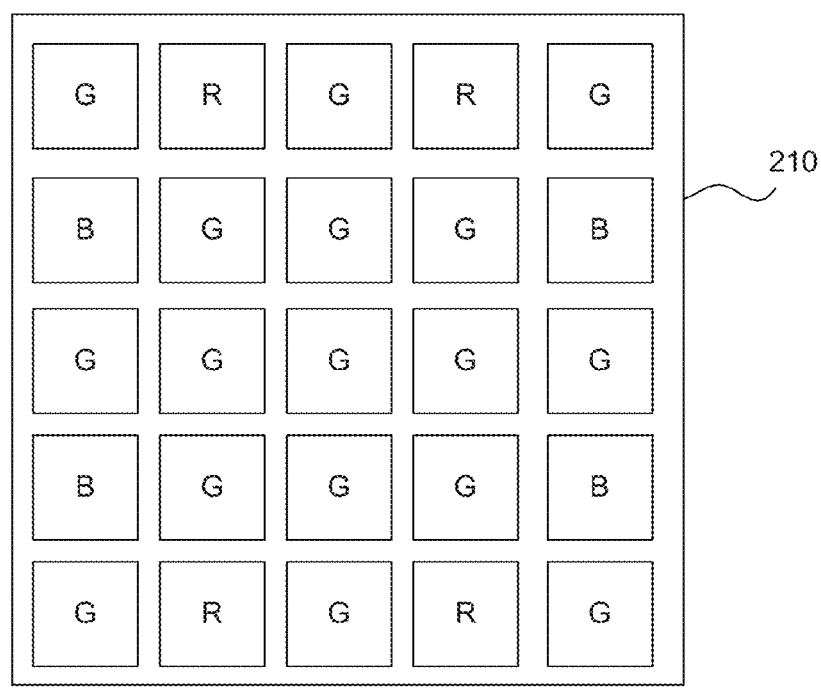
Figure 2C:
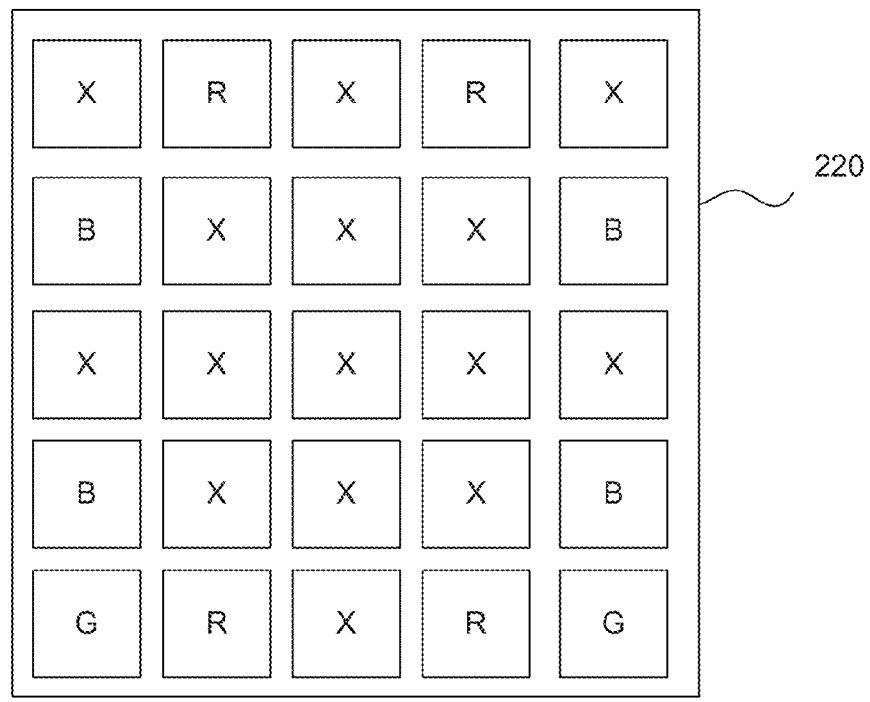

A 5×5 imager array (210) including 17 imagers that sense green light (G), four imagers that sense red light (R), and four imagers that sense blue light (B) is illustrated in FIG. 2B. In several embodiments, the imager array also includes imagers that sense near-IR wavelengths, which can be used to improve the performance of the array camera in low light conditions. A 5×5 imager array including near-IR sensors is illustrated in FIG. 2C. The imager array 220 includes four imagers that sense red light (R), four imagers that sense blue light (B), and two imagers that sense green light. The remaining fifteen imagers indicated with an X can be either imagers that sense green light or imagers that sense near-IR wavelengths. In many embodiments, the distribution of imagers that sense green light and imagers that sense near-IR wavelengths is determined so that distribution is symmetrical.

Figure 2D:
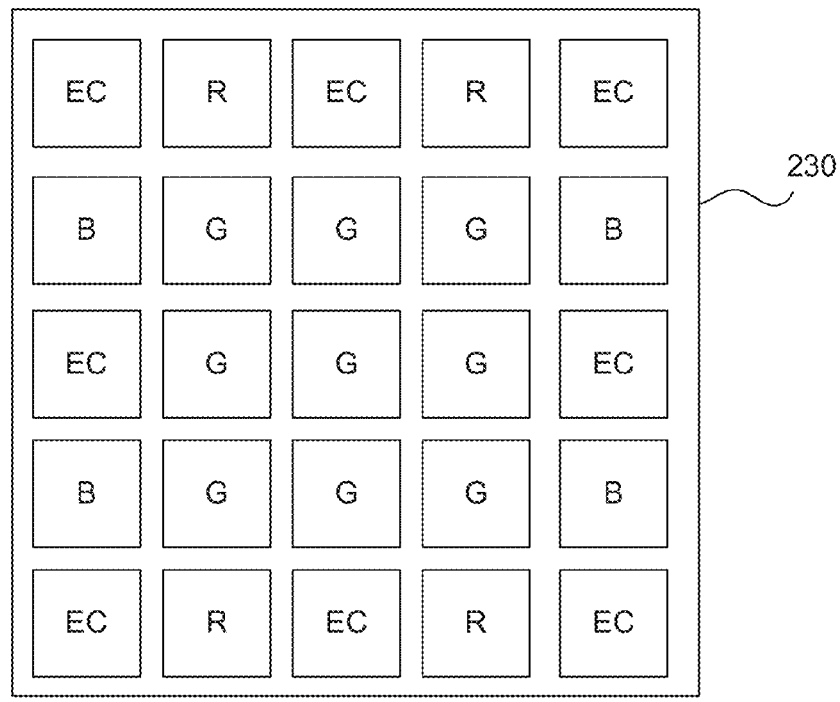

In many embodiments of the invention, the imager array includes extended color (EC) imagers. As will be discussed further below, an extended-color channel is a channel that is designed to include both non-visible wavelengths and visible wavelengths. In many embodiments, the extended-color channel extends from green spectral wavelengths to the near-IR. A 5×5 imager array including extended color (EC) sensors is illustrated in FIG. 2D. The imager array 230 includes four imagers that sense red light (R), four imagers that sense blue light (B), nine imagers that sense green light (G), and eight imagers that sense extended-color (EC).

Although specific configurations for imagers that sense blue light (B) and imagers that sense red light (R) are illustrated, these imagers can be switched with respect to each other. Additional imager array configurations are disclosed in U.S. Provisional Patent Application Ser. No. 61/281,662 to Venkataraman et al., the disclosure of which is incorporated by reference herein in its entirety.

Each imager in the imager array captures a low resolution (LR) image. Image information captured by imagers, whose sensitivity is tuned by some means (e.g., color filters) to the same portion of the wavelength spectrum, can be considered as constituting a channel of imaging information. When different imagers are tuned to different portions of the wavelength spectrum, then multiple channels of image information are produced that can be provided as inputs to a super-resolution (SR) process in accordance with embodiments of the invention. In several embodiments, the imager array captures a single channel of information (B/W), or 3 channels of information (RGB). In many embodiments, the imager array captures the 3 RGB channels and a fourth near-IR channel that can also be used during SR processing to produce a synthesized higher resolution image.

Although specific imager array configurations are disclosed above, any of a variety of regular or irregular layouts of imagers including imagers that sense visible light, portions of the visible light spectrum, near-IR light, other portions of the spectrum and/or combinations of different portions of the spectrum can be utilized to capture LR images that provide one or more channels of information for use in cross-channel fusion and SR processes in accordance with embodiments of the invention. The processing of captured LR images is discussed further below.

Image Processing Pipeline for Super Resolution

Figure 3:
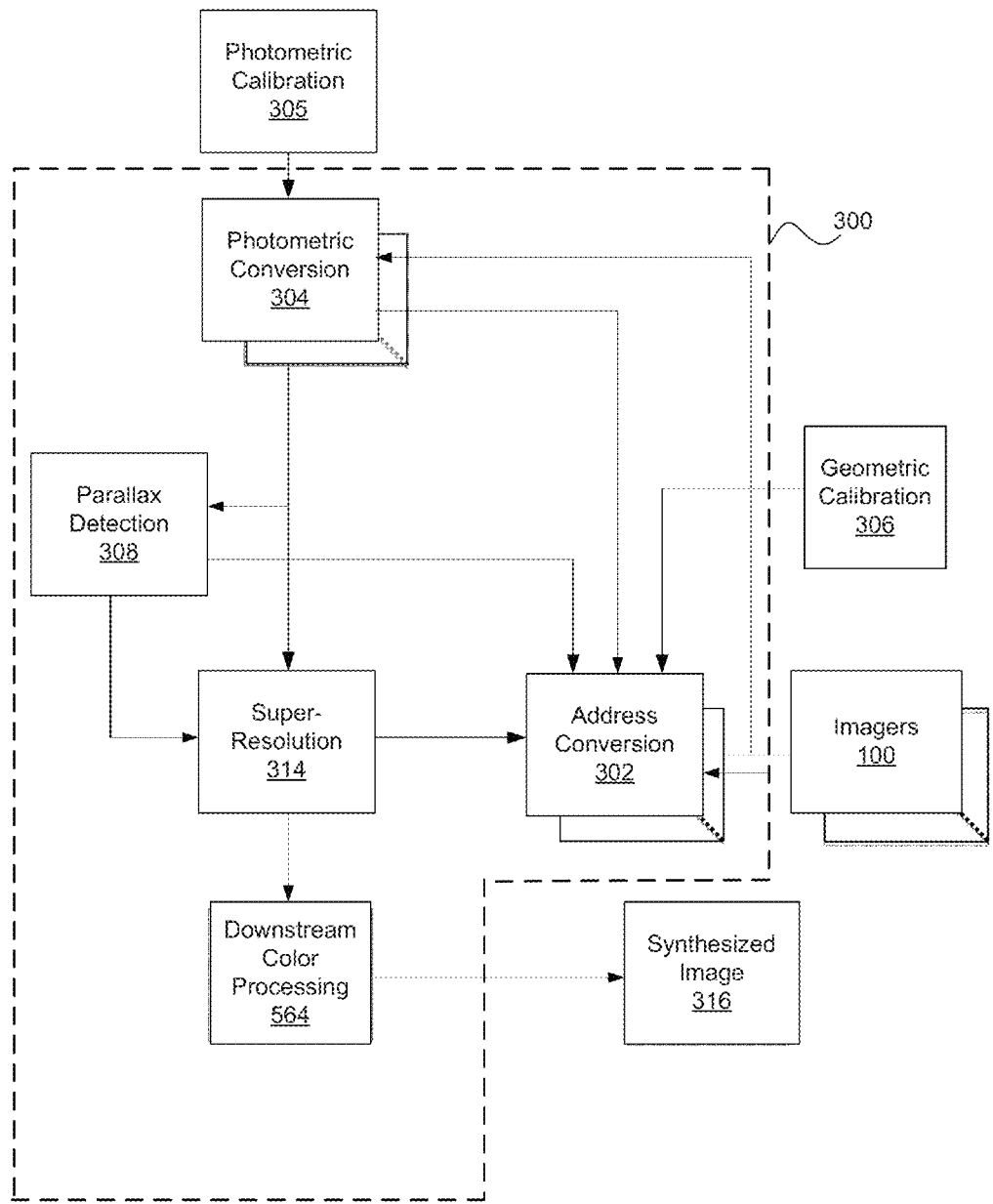
FIG. 3 illustrates an image processing pipeline in accordance with an embodiment of the invention.

U.S. patent application Ser. No. 12/967,807 incorporated above discloses super resolution (SR) processes for generating a high resolution (HR) image from low resolution (LR) images captured by an array camera. The processing of LR images to obtain an HR image in accordance with embodiments of the invention typically occurs in an array camera's image processing pipeline. An image processing pipeline in accordance with embodiments of the invention is illustrated in FIG. 3. In the illustrated image processing pipeline 300, pixel information is read out from imagers 100 and is provided to a photometric conversion module 304 for photometric normalization using the captured LR images and photometric calibration data. The output photometrically normalized images are provided to a parallax detection module 308 and to a super-resolution module 314.

Prior to performing SR processing, the image processing pipeline detects parallax (or disparity), which becomes more apparent as objects in the scene captured by the imager array approach the imager array, using the parallax detection module 308. Parallax information can be provided to the super-resolution module 314 in the form of parallax corrections (scene dependent geometric displacements) and occlusion maps (showing where content is captured in some cameras but not other cameras due to parallax effects).

Once the parallax information has been generated, the parallax information and the photometrically normalized LR images are provided to the super-resolution module 314 for use in the synthesis of one or more HR images 316. In many embodiments, the super-resolution module 314 performs scene dependent geometric corrections using the parallax information and scene independent geometric corrections using geometric calibration data 306 obtained via the address conversion module 302.

The LR images acquired by an imager array in accordance with an embodiment of the invention are typically afflicted by geometric distortions inherent to the optics and manufacturing processes used to fabricate the imager array, which are not scene dependent, and parallax distortions, which are scene dependent. SR processes can use information about initial scene-independent geometric corrections of the LR images, and about correcting the scene-dependent geometric distortions introduced by parallax in the LR images. The scene-independent geometric corrections and the scene-dependent geometric corrections (i.e., parallax) are referred to as the geometric corrections for the LR images. Any of a variety of spatial registration approaches can be used to determine the information about the scene-independent geometric corrections for the LR imagers, and typically this portion of the spatial registration of the image content of the acquired LR images is generated using the output of well-known geometric calibrations techniques, which can be performed "off-line".

The photometrically normalized and geometrically registered LR images are then utilized in the synthesis of an HR image. The synthesized HR image 316 may then be fed to a downstream color processing module 564, which can perform color correction and/or chroma level adjustment.

Super Resolution Module

In several embodiments, the SR process is initialized by performing a pilot fusion process that joins (or places) and processes data from multiple input LR images onto a higher resolution output grid to produce a first fused image. The pilot fusion process can involve filling missing samples on the output grid and filtering potentially misplaced samples. A SR process can use the pilot fused image along with the original LR images to perform an optimal image fusion and restoration according to a predetermined objective function.

Figure 4:
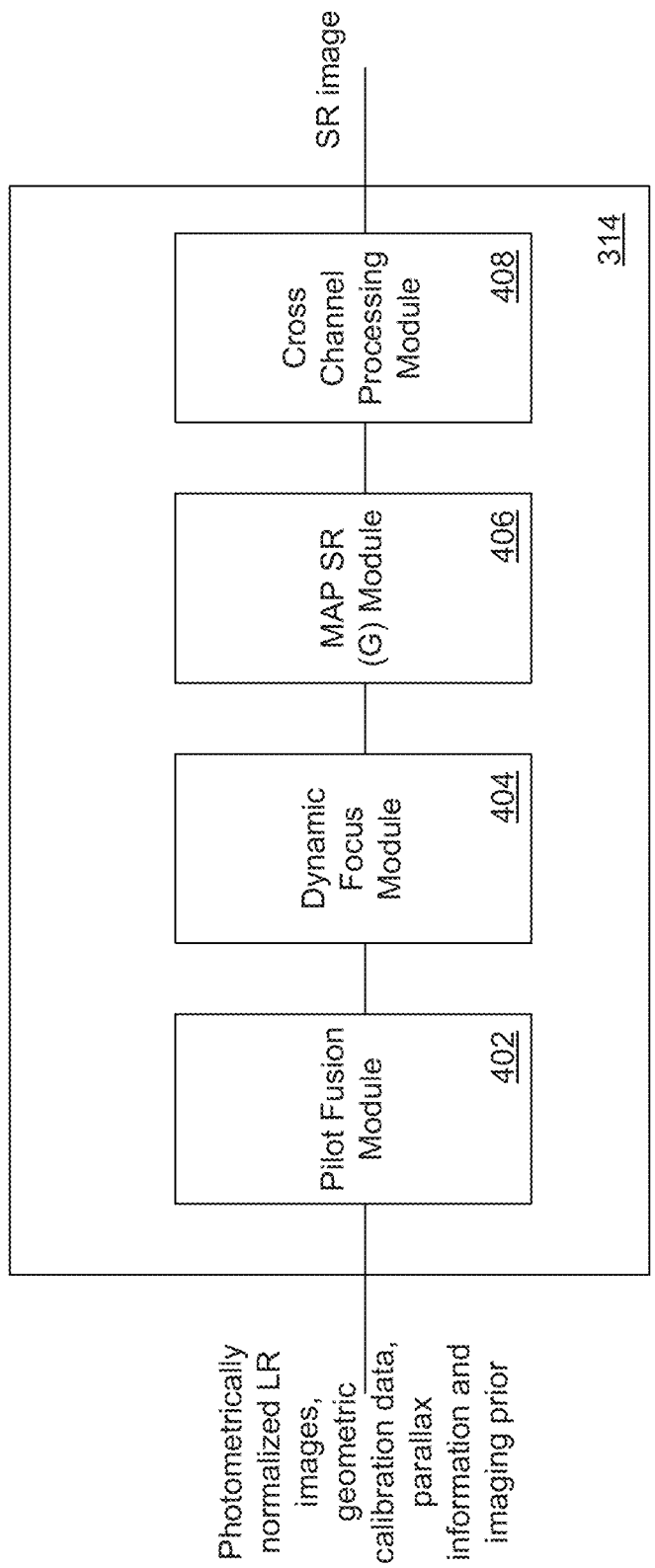
FIG. 4 illustrates a SR module in accordance with an embodiment of the invention.

An SR module disclosed in U.S. patent application Ser. No. 12/967,807 is conceptually illustrated in FIG. 4. The SR module 314 receives as inputs photometrically normalized image data, in possibly multiple spectral or color channels, scene-dependent geometric correction information (parallax information) and scene-independent geometric correction information (geometric calibration data). Through a sequence of operations, the SR module generates a higher resolution image corresponding to some or all of the input spectral channels.

The SR module 314 includes a Pilot Fusion module 402, a Dynamic Focus module 404, a Maximum A Posteriori Super Resolution (MAP SR) module 406, and a Cross Channel Processing module 408. The Pilot Fusion module 402 performs a pilot fusion process using parallax information and either photometrically normalized LR images and geometric calibration data, or photometrically normalized and geometrically registered LR images. The term fusion can be used to refer to a process by which image data samples from multiple images having lower resolution are processed and placed appropriately onto a generally higher resolution grid. This is done such that the LR image samples are placed appropriately onto the output grid (using the geometric corrections—i.e. scene independent geometric calibration data and scene dependent parallax information), and such that positions on the grid where there are missing samples get filled, and a filtering of potentially misplaced samples (outliers) occurs. The geometric correction information provided to the SR module is sufficient to spatially register all, or subsets, of the captured LR images in a common system of coordinates and can use a reference system of coordinates, which can be that of an arbitrarily or purposefully-picked image from the LR image set of a channel.

The Dynamic Focus module 404 may determine a high resolution depth map, or an equivalent representation of it, using the parallax information of the LR samples transferred onto the fusion grid, along with information about the geometry of the imager (e.g., inter-LR image baselines). The Dynamic Focus module uses the HR depth map to determine the set of pixels on which subsequent blocks in the SR processing pipeline operate (i.e., the pixels containing information concerning the "in-focus" areas of the HR image estimate).

The MAP SR module 406 uses a maximum a posteriori (MAP) estimate to obtain good estimates for pixels of a synthesized HR image based upon at least the observed LR images and, in many instances, other observed information and/or prior constraint information. The SR process can estimate an HR image for a single channel such as the Green channel based upon at least the fused image output by the Pilot Fusion module 402, the LR image data (raw, photometrically normalized or photometrically normalized and geometrically registered LR images), geometric correction information including an occlusion map, and an imaging degradation model (discussed below) that can include an imaging prior (where available). The HR image estimate for the first channel (e.g. the Green channel) can then be used in cross channel processes to estimate SR images for the other channels and to synthesize a full color SR image.

The Cross Channel Processing module 408 estimates HR images for the Blue and Red color channels using the HR Green channel estimate generated by the MAP SR module 406. The output of the Cross Channel Fusion module is a synthesized HR image including color information from multiple channels.

Pilot Fusion Processes

Figure 5:
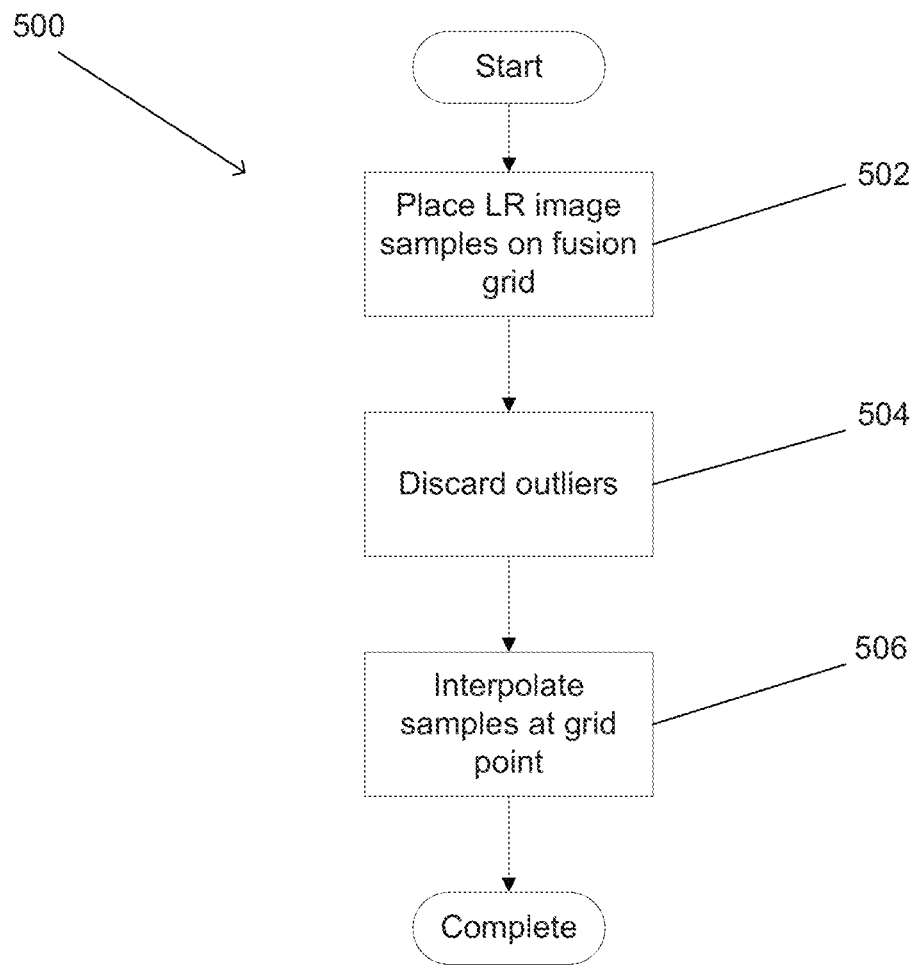
FIG. 5 is a flow chart illustrating a pilot fusion process in accordance with an embodiment of the invention.

A pilot fusion disclosed in U.S. patent application Ser. No. 12/967,807 is illustrated in FIG. 5. The process 500 includes placing (502) the LR image samples from each input LR image on a fusion grid in accordance with geometric correction information (i.e. scene independent geometric calibration data and scene dependent parallax information forming the total pixel shift) associated with the input LR images.

Figure 6:
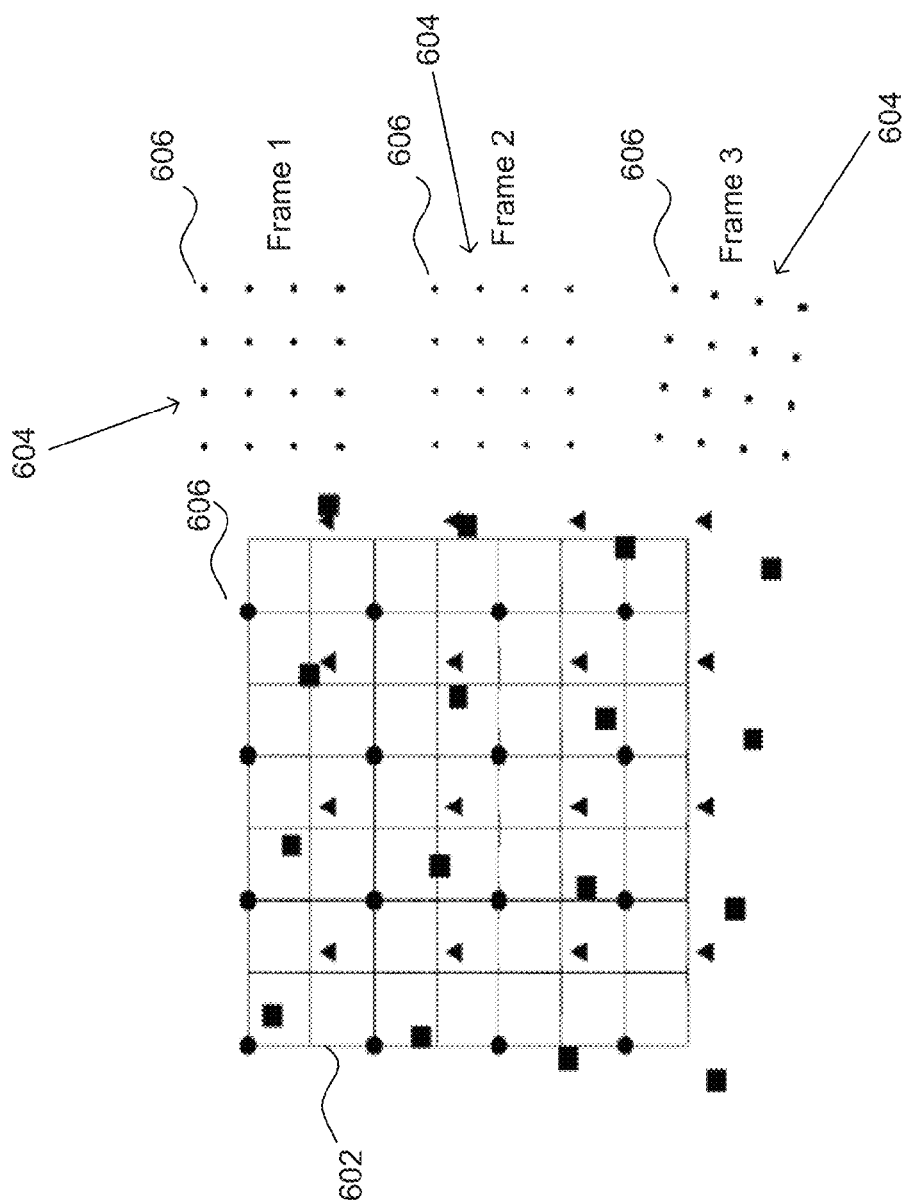
FIG. 6 conceptually illustrates placement of LR image samples on a fusion grid in accordance with an embodiment of the invention.

Placement of LR image samples on a fusion grid in accordance with an embodiment of the invention is illustrated in FIG. 6. In the illustrated embodiment, the pilot fusion fuses three LR images 604 intra-channel (i.e., using the image data only from the fused channel) and the first step in the pilot fusion process is to place the LR image samples 606 onto the fusion grid 602 using the geometrical correction information provided at its input. The LR image samples 606 from each of the first, second, and third LR images are indicated on the fusion grid 602 as circles, triangles, and squares respectively. The first LR image (i.e. "Frame 1") is taken as the reference image (geometrically), and the other LR images are transferred onto the fusion grid 602.

Referring again to FIG. 5, outlier image samples are then identified (504) and removed. Processes for identifying outliers typically involve identifying pixels that possess very low levels of correspondence with neighboring pixels. Once outliers are removed from the fusion grid, the remaining image samples can be interpolated (506) to determine values at all fusion grid positions. In many embodiments, the pilot fusion generates a regularly sampled, initial estimate of the higher resolution image sought for by the SR processing, onto the fusion grid 602. This estimate represents the input to the next SR Processing module 406, which performs the super-resolution restoration processing. Pilot fusion can also be used in a cross-channel fusion process to produce initial fused images in each of a visible imaging channel and a non-visible imaging channel.

Super Resolution Processing

Figure 7:
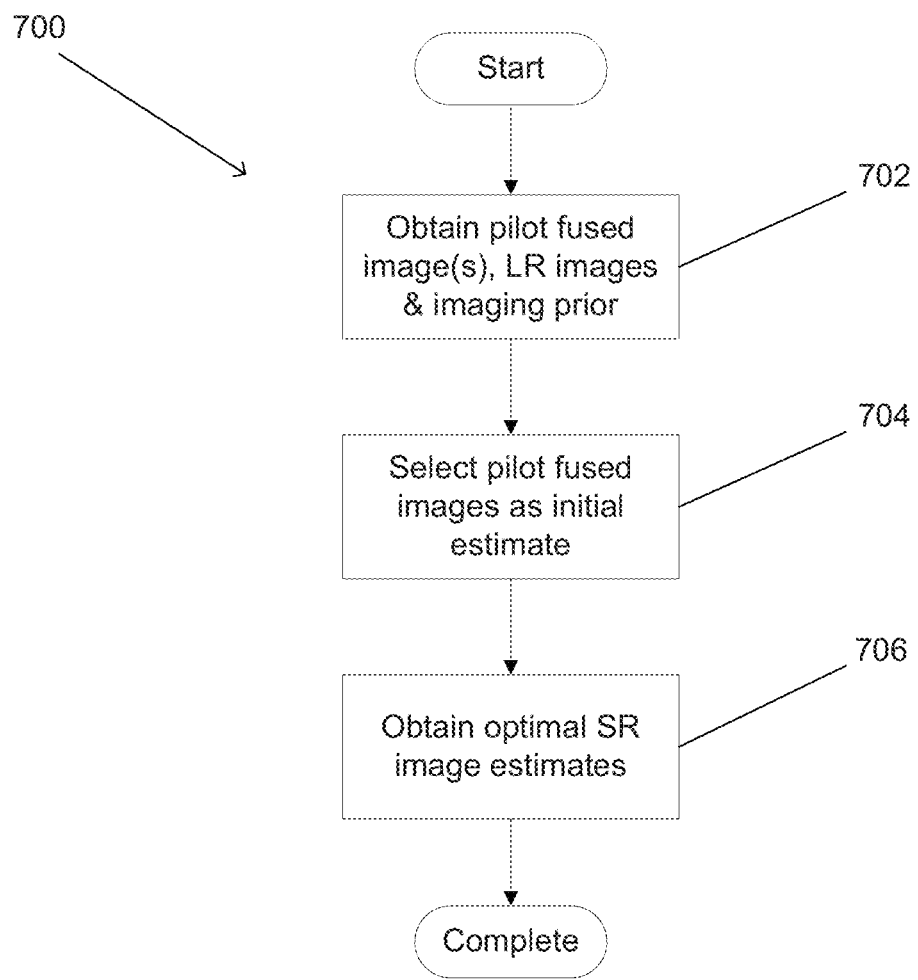
FIG. 7 is a flow chart illustrating an SR process that obtains optimal SR image estimates from LR images in a manner that accounts for uncertainty in the upstream processing of the LR images in accordance with an embodiment of the invention.

The MAP SR module 406 uses a statistical estimation approach to determine the super-resolved images for each output spectral channel. An SR process disclosed in U.S. patent application Ser. No. 12/967,807 is illustrated in FIG. 7. The process 700 obtains (702) as its inputs the pilot fused image, the photometrically normalized LR image data for each input spectral channel, geometric correction information, and an imaging prior if available. The pilot fused image is selected (704) as an initial estimate in an optimization process that seeks to obtain (706) optimal HR image estimates given the input LR images captured by the imager array and a forward imaging transformation (built based on an image degradation model). In a number of embodiments, the SR process utilizes a proprietary form of a maximum a posteriori (MAP) objective criterion formulation, which is then optimized with respect to the SR image to be estimated for at least one output spectral channel. Objective criterion formulations utilizing a specific forward imaging transformation that describes image degradation are discussed in greater detail in U.S. patent application Ser. No. 12/967,807 incorporated by reference further above.

Figure 8:
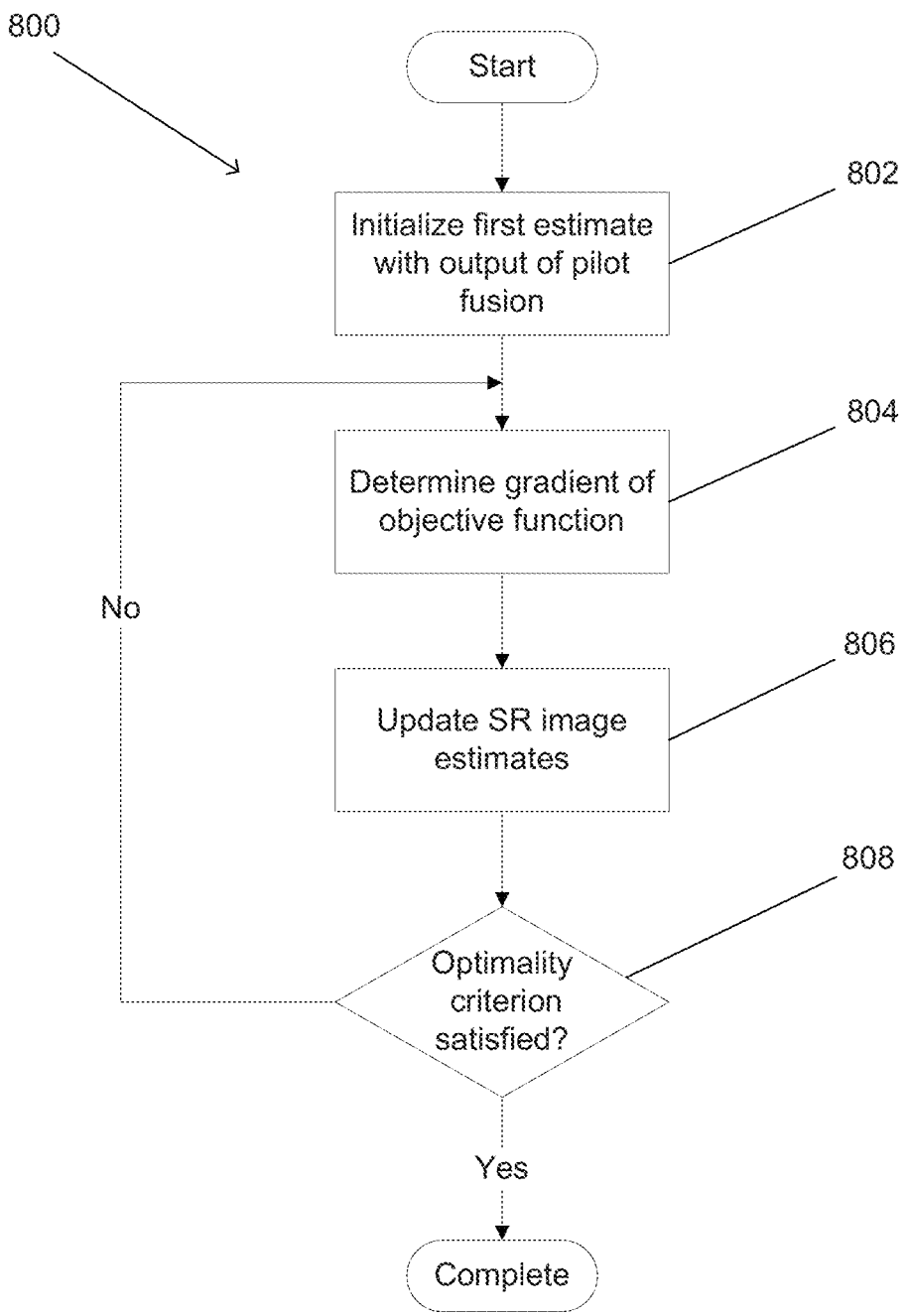
FIG. 8 is a flow chart illustrating a process for obtaining an optimal SR image estimate using a gradient descent optimization technique in accordance with an embodiment of the invention.

A MAP process can involve iteratively refining an estimate of an HR image using an gradient descent technique to obtain an optimal SR image estimate(s). A process for using gradient descent to obtain optimal SR image estimates in accordance with an embodiment of the invention is illustrated in FIG. 8. The process 800 includes initializing (802) the first estimate with the output of the pilot fusion process described previously. The gradient is determined (804) and a new estimate obtained (806). The process can utilize a gradient $\nabla_{x^c} J(x^c)$ of the form:

$$\nabla_{x^c} J(x^c) = VT(x^c) + \psi_{\Lambda_1}^{intra}(x^c) + \Phi_{\Lambda_2}^{inter}(x^c, \tilde{x}^{c'}), \quad (1)$$

as described in U.S. patent application Ser. No. 12/967, 807. The process can either iterate until a predetermined optimality criterion is satisfied (808) or for a finite number of iterations.

SR Processes Incorporating Cross-Channel Fusion

SR processes in accordance with embodiments of the invention can exploit information from visible and non-visible (typically infra-red) imaging channels to facilitate the generation of a synthesized image, which has higher resolution than any of the individual input channel images. In a number of embodiments, the visible and non-visible channels are distinct. In other embodiments, the visible and non-visible channels possess some degree of overlap. The acquisition of the visible and non-visible portions of the spectrum by an imaging device produces data that has different characteristics (such as blur levels, imaging noise, or absolute and relative amplitude responses in the image). In addition, each channel can have a native image resolution that is not necessarily the same between channels. In many embodiments that utilize visible and non-visible channels in SR processing, the visible and non-visible channels are treated jointly and processes are performed that normalize and transfer the LR image samples from each channel onto a common (higher) resolution grid.

Figure 9:
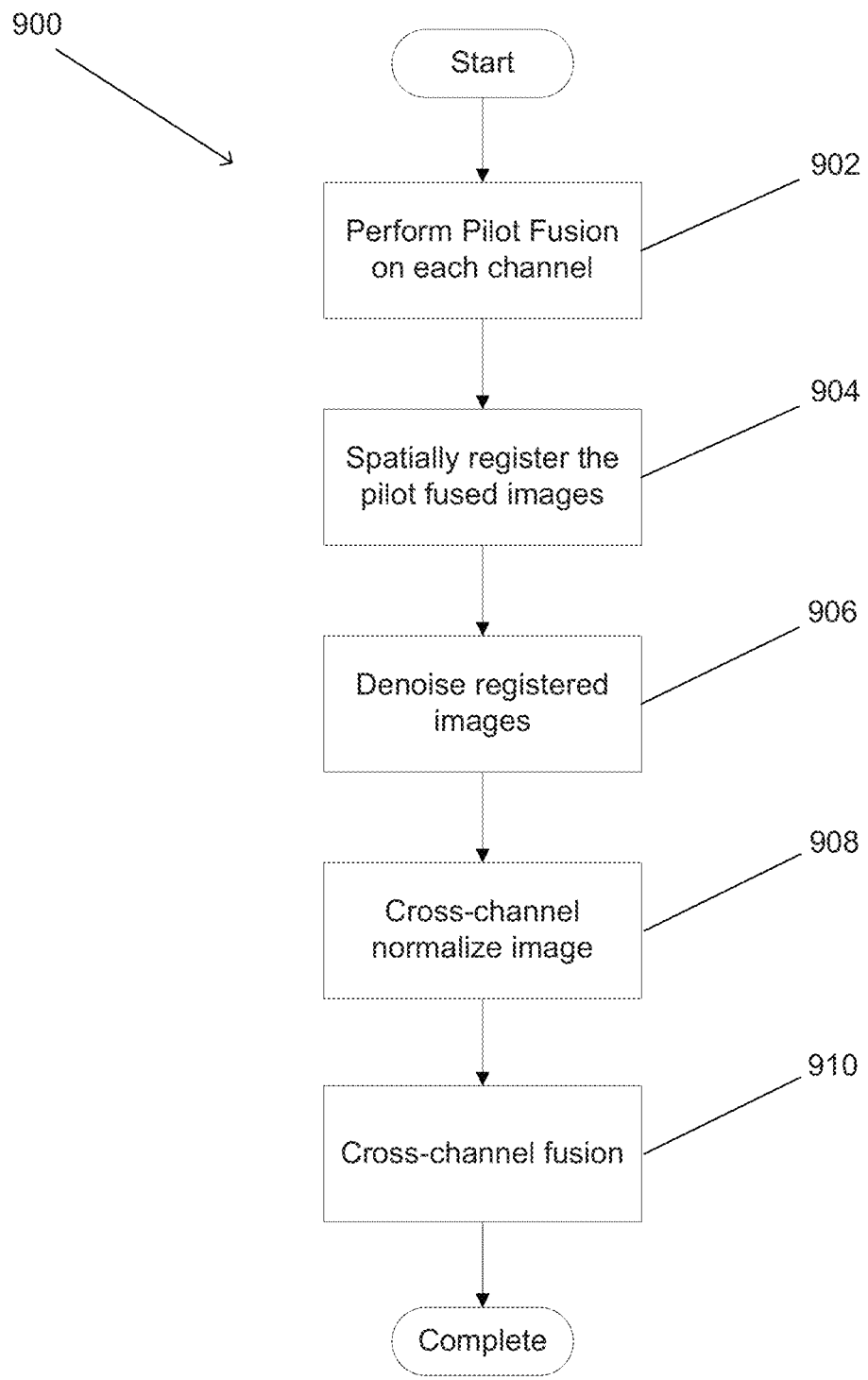
FIG. 9 is a flow chart illustrating a process for performing cross-channel normalization and fusion of two input-channels covering different portions of the wavelength spectrum in accordance with an embodiment of the invention.

A process for performing cross-channel normalization and fusion of two input-channels covering different portions of the wavelength spectrum (i.e. visible and non-visible) in accordance with an embodiment of the invention is conceptually illustrated in FIG. 9. The process receives as inputs multiple LR images for each channel, where each LR image is acquired at a given resolution, and spatial registration information. In many embodiments, the process also receives as additional input information concerning characteristics of the imaging conditions including, but not limited to, information indicative of light conditions such as the imager analog gain and noise information. The process performs (902) a pilot fusion process on each channel that is similar to the pilot fusion process described above. During the pilot fusion process, the LR image samples of a channel are fused onto an intermediate grid. Each channel's intermediate grid has the same resolution, which is typically higher than that of the input LR images. As discussed above, pilot fusion processes in accordance with embodiments of the invention can utilize interpolation and filtering processes that are locally adaptive and, which in many embodiments, use information about the noise statistics of the acquiring sensor, as well as imaging condition information including but not limited to the analog gain of the imagers.

The process 900 includes spatial registration (904) between the two fused channel images. Given differences between the information in each of the two channels, many embodiments of the invention determine this registration using the higher resolution intermediate grids. Attempting to spatially register the LR images of the two channels in their native (lower) resolutions can be more difficult. Any of a variety of known spatial registration processes appropriate to the application can be utilized. In general, however, the differences between the information contained in visible and non-visible channels means that feature-based spatial registration processes tend to provide the best spatial alignment between the non-visible channel fused image and the visible channel fused image.

As a pre-cursor to cross-channel normalization, the fused images are denoised (906). In a number of embodiments, filtering operations are applied cross-channel (i.e., between the visible and non-visible spatially registered channels). In several embodiments, bilateral filters are used to perform local filtering operations. As noted above, the weights of bilateral filters are a function of both the photometric and geometric distance between a pixel and the pixels in its neighborhood. In a number of embodiments, a cross-channel bilateral filter is first applied to the visible channel fused image, using weights (or the local kernels) determined for the bilateral filter that would normally be applied to the non-visible fused image. The bilateral filter is applied in this way to exploit the advantageous properties of the non-visible channel. For example, when the non-visible channel is a near-IR channel, the channel generally has a higher SNR in low light conditions. In many embodiments, the cross-channel filtering is applied conditionally based upon imaging conditions. Thus, for low light conditions (e.g., defined by the value of the imager analog gain), a cross-channel bilateral filter is applied. For higher light conditions, however, a conventional bilateral filter whose weights are determined based on the visible-channel image (i.e. no longer using information from the other channel) is applied. In a number of embodiments, both the cross-channel and conventional bilateral filtering processes are done locally and are adapted using available noise statistics information. The non-visible channel fused image is also denoised (906). In a number of embodiments, denoising is performed using a conventional bilateral filter (i.e. using weights determined based on the non-visible channel fused image). In many embodiments, the bilateral filtering of the non-visible channel denoised image is also adaptive using available noise statistics information.

Figure 10A:
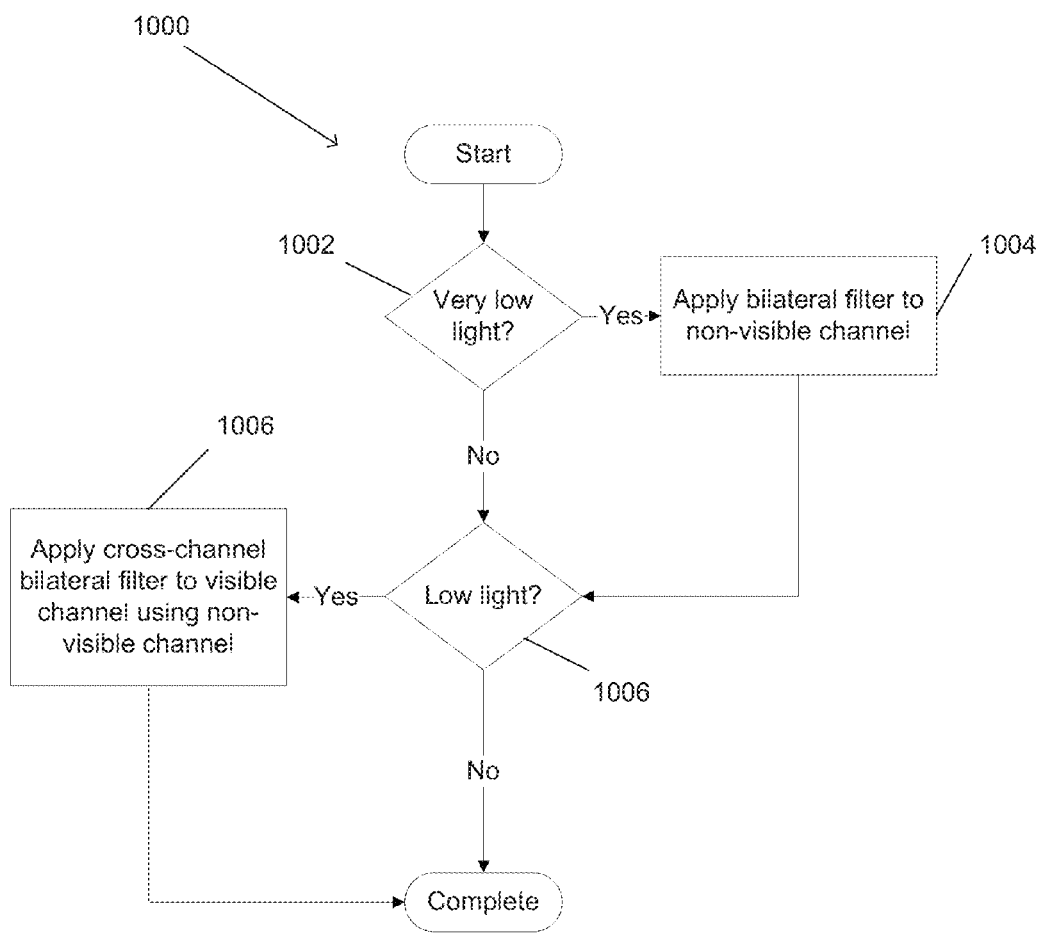
FIG. 10A is a flow chart illustrating a process for applying bilateral filters to denoise images in accordance with embodiments of the invention.

A process for applying bilateral filters to denoise images in accordance with embodiments of the invention is illustrated in FIG. 10A. The process includes determining (1002) if there is a very low light condition. If there is very low light, a bilateral filter is applied (1004) to the non-visible channel. The process also includes determining (1006) if there is a low light condition. If there is low light, a cross-channel bilateral filter is applied to the visible channel using weights from the non-visible channel. Although specific cross-channel denoising filters are disclosed above, any of a variety of filtering and cross-channel filtering techniques can be used to denoise the non-visible and visible fused images as appropriate to a specific application in accordance with embodiments of the invention.

Referring again to FIG. 9, one fused image is cross-channel normalized to the other fused image (908). In a number of embodiments, the normalization is performed by generating gain and offset values for pixels in the image to be normalized.

In several embodiments, the denoised non-visible channel fused image is normalized in the photometric reference space of the denoised visible channel fused image by applying gains and offsets to pixels of the denoised non-visible channel fused image. For a neighborhood window around an EC pixel and the corresponding G pixel, determine the gain and bias required to adjust the EC pixel to the local characteristics of the G channel. The gain and offset for each normalized EC pixel can be determined using the following equations:

$$\bar{e} = \frac{1}{N_r N_c} \sum_r \sum_c e(r, c), \quad (2)$$

$$\bar{g} = \frac{1}{N_r N_c} \sum_r \sum_c g(r, c), \quad (3)$$

$$\hat{a} = \frac{\left[\sum_r \sum_c g(r, c) \cdot e(r, c)\right] - N_r N_c \bar{g} \cdot \bar{e}}{\left[\sum_r \sum_c e^2(r, c)\right] - N_r N_c \bar{e}^2}, \quad (4)$$

$$\hat{b} = \bar{g} - \hat{a} \cdot \bar{e}, \quad (5)$$

$$e_n(i, j) = \hat{a} \cdot e(i, j) + \hat{b} \quad (6)$$

where e=the image to be normalized (EC channel), g=the reference image (green channel), $N_r$ and $N_c$ are the number of pixels horizontally and vertically of the neighborhood of pixels around the pixel being computed (EC), and r and c are row and column indices into the images within the bounds defined by $N_r$ and $N_c$. The computed $\hat{a}$ is the gain and $\hat{b}$ is the offset for each pixel $e_n(i, j)$ to be normalized. In further embodiments, a joint-bilateral-style normalization can be utilized determine a subset of pixels to normalize using the above equations as will be discussed further below. In other embodiments, any of a variety of normalization techniques can be applied as appropriate to a specific application. Moreover, in different applications (such as low light "night vision") the visible channel fused image can be normalized to the non-visible channel fused image.

In many embodiments, the denoised fused images are discarded following the generation of the gains and offsets and the original non-visible fused image (i.e., the image prior to denoising) is normalized photometrically to the reference space of the original fused visible channel image (i.e., the image prior to denoising).

Once the two fused images are normalized, the two normalized fused images are fused (910) onto a common higher resolution grid using a pilot fusion process similar to the process used to initially create the two fused images.

In the process described above, if the output fused image is intended for human viewing, information from the non-visible channel may not be desired in the output image. Therefore, the process can be disrupted to ignore predetermined features or information from the non-visible image. For example, features that exist in the non-visible fused image, and do not exist in the visible image, or vice-versa, can disrupt the photometrical normalization of the images. In a number of embodiments, local features are compared in the two fused and spatially-registered channel images using a bilateral filter weight determination, to: a) eliminate the undesired information existing in the non-visible channel, and prevent it from being transferred into the visible channel; and b) to prevent the improper determination of cross-channel bilateral filter weights to be applied in the visible channel, due to features existing in the non-visible channel and missing in the visible channel. In other embodiments, a joint bilateral filter is used that does not transfer edges from one source channel to the output. Any of a variety of techniques can be utilized to exclude non-desired information from the non-visible channel appropriate to a specific application in accordance with embodiments of the invention. A process for joint-bilateral-style-normalization that can be utilized to determine a subset of pixels to be cross-channel normalized is discussed below.

Joint-Bilateral-Style Normalization of Diverse Spectral Channels with Edge Preservation The response of different spectral channels to a particular reflected color can be similar or completely uncorrelated. Adjoining different colored areas might exhibit an edge or might be perceived as the same and exhibit no hint of an edge. The one constant is that the relative response to a given color remains the same throughout a scene.

In order to utilize two or more spectral channels for purposes of SR, the levels of response to a given color can be adjusted to be the same. Generally adjusting the levels is simply and effectively accomplished using a neighborhood-based gain and offset normalization, as described above. However, in areas of strong edges due to highly contrasting colors (i.e. highly contrasting response to particular colors) information from areas that do not contain the pixel of interest can cause artifacts along edges to a distance from the edge equal to half the window width. In order to constrain the information in the filter to areas consistent with the pixel of interest a bilateral-filter approach can be employed.

Bilateral filters have excellent edge-preserving capabilities as pixels similar in quality (level/color, distance, etc.) to the pixel of interest are the most highly weighted in the filter calculations. Gain and offset normalization, however, does not apply a convolution-style filter but rather uses data in a neighborhood of the pixel-of-interest and the neighborhood of its corresponding pixel in the training channel to find a best (least-squares) estimate of a bias and gain adjustment for the pixel of interest. A joint bilateral filter style approach can be employed to restrict the estimation to be based on only those pixels that meet a similarity requirement. The proximity of the POI to an edge or its corresponding pixel to an edge is complicated by the case of a given edge appearing in one channel but not in the other. An additional complication is that an edge that appears in a non-visible-light spectral channel but not in a visible light channel should not be suppressed for normal imaging (but perhaps for certain hyper-spectral imaging cases).

Figure 10B:
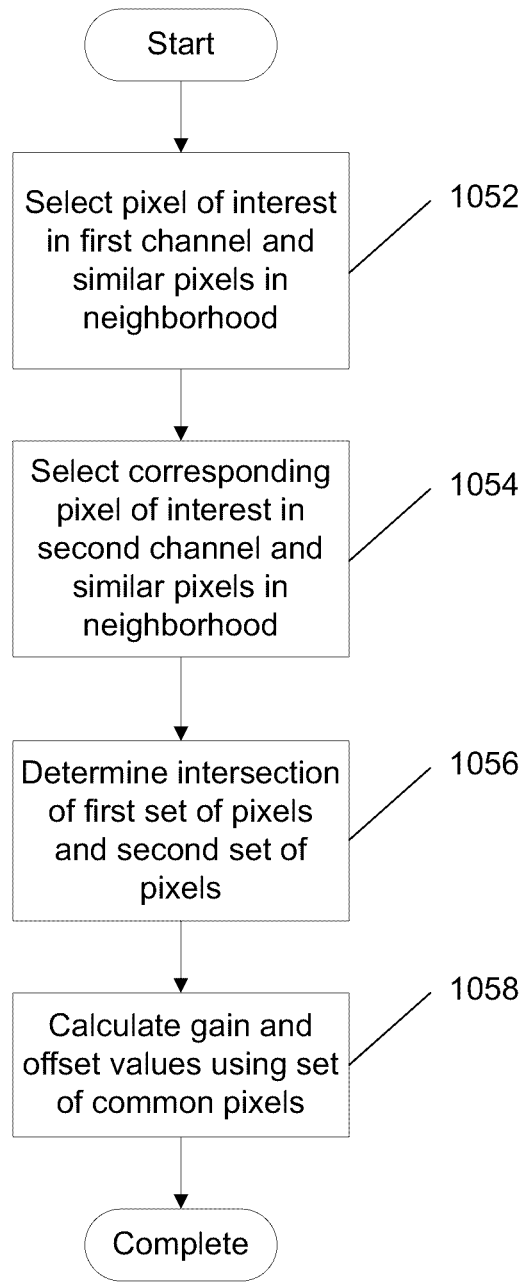
FIG. 10B is a flow chart illustrating a process for joint-bilateral-style normalization of one spectral channel to another spectral channel in accordance with embodiments of the invention.

A process for joint-bilateral-style normalization of one spectral channel to another spectral channel in accordance with embodiments of the invention is illustrated in FIG. 10B. In several embodiments of the invention, the joint bilateral filter style normalization of two channels involves selecting (1052) a pixel of interest in the first channel and a collection of similar pixels in the neighborhood of the pixel of interest. Without loss of generality, the first channel can be assumed to be registered with less than ½ pixel difference to the second channel. Similarity of pixels can be defined in a bilateral-filter-style manner where the resulting value is thresholded to make a binary decision whether to include or exclude a particular pixel from the neighborhood calculation. In many embodiments, similarity criteria also considers signal to noise ratio.

In the second channel, select (1054) a pixel of interest corresponding to the first pixel of interest and a collection of pixels similar to that corresponding pixel of interest. Because colors in a scene are often mapped to the same level or value in a spectral channel, it is sometimes the case that the two collections of pixels do not have a positional one-to-one correspondence. However, one collection should usually be a subset of the other (modulo noise and difference due to subpixel-level misregistration). The intersection of the two collections of pixels (i.e., pixels in common) is then determined (1056) and used to calculate (1058) the gain and offset estimates using equations (2) to (6) above. In many embodiments, the denoised non-visible channel fused image is the first channel normalized to the denoised visible channel fused image which is the second channel. However, any image can be used as the first and second channel as appropriate to a specific application. For example, in an application using "night vision" in ultra low light conditions, a visible channel (e.g., green) may be normalized to a non-visible channel. In some applications, an "extended-color" channel includes visible and non-visible wavelengths, and can offer advantages over a strictly non-visible channel when used in place of a non-visible channel in some of the image processing methods discussed above. The use of "extended-color" channels is discussed below.

Use of "Extended-Color" Channels

Figure 11A:
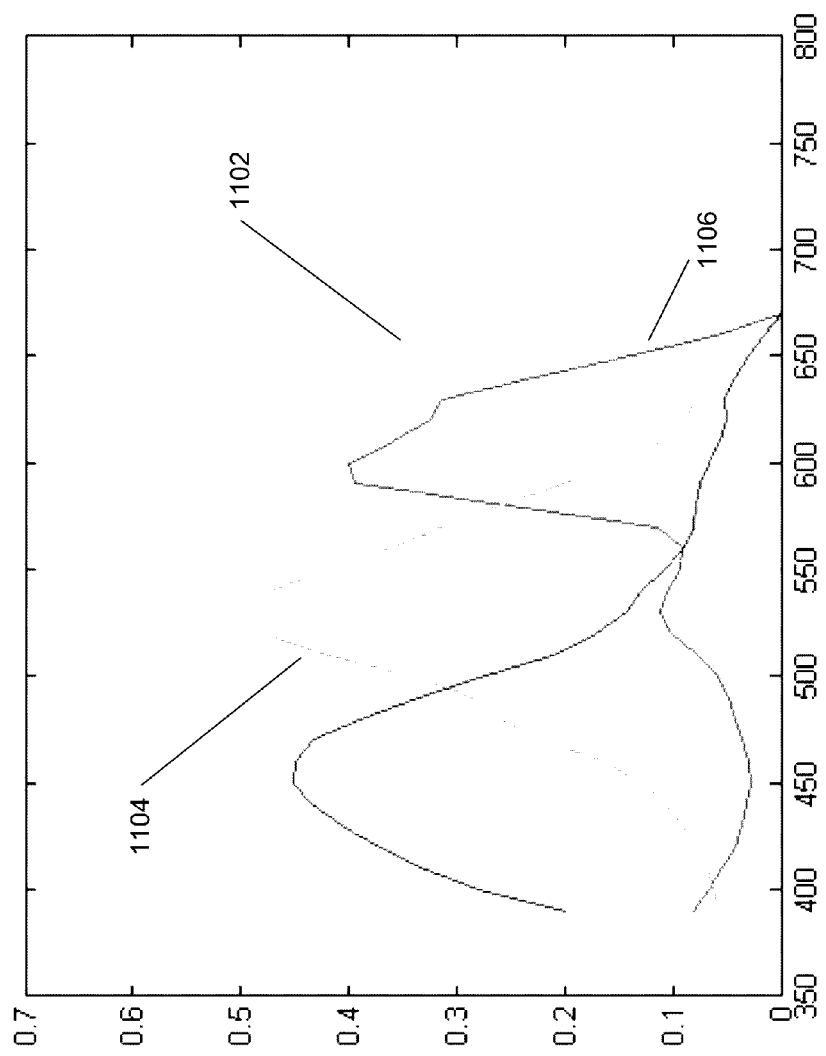
FIGS. 11A and 11B are graphs illustrating the channel response of extended-color channels in accordance with embodiments of the invention.

Use of non-visible channels of information during image fusion and super-resolution in accordance with embodiments of the invention can exploit certain characteristics of the non-visible channels, such as sensitivity in low light imaging conditions. Such requirements can be satisfied by a near infra-red channel that can supplement the information captured in visible-light channels. However, such diversity of the channels in the context of super-resolution can introduce additional difficulties in fusing the information together to achieve the desired super-resolution factor increase. The difficulties are primarily related to the challenges associated with spatially registering with fine precision the spectrally-diverse channel images, and also the problem of normalizing the photometric responses (e.g., absolute and relative signal magnitudes) across the two channels, such that the overall information can be properly fused onto a common grid. In many embodiments, a cross-channel fusion is performed using a so-called "extended-color" channel in place of the non-visible channel. An extended-color channel is a channel that is designed to overlap spectrally with the visible channel spectrum. In many embodiments, the extended-color channel extends from green spectral wavelengths to the near-IR. The channel response of an extended-color channel in accordance with embodiments of the invention is illustrated in FIG. 11A. As can be seen from FIG. 11A, the channel response 1102 of the extended-color channel encompasses green 1104, red 1106, and near-IR spectral wavelengths.

Figure 11B:
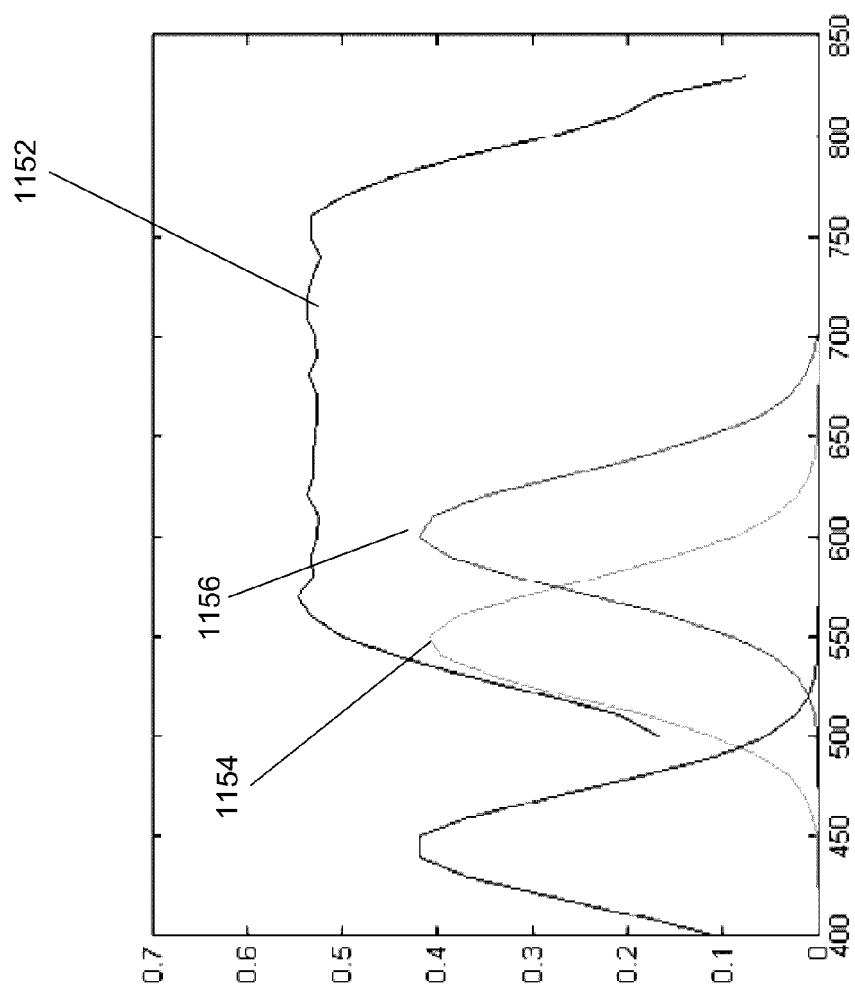

The channel response of an alternative extended-color channel in accordance with embodiments of the invention is illustrated in FIG. 11B. As can be seen from FIG. 11B, the channel response 1152 of the extended-color channel encompasses green 1154, red 1156, and near-IR spectral wavelengths. Although specific channel responses are illustrated in FIGS. 11A and 11B, extended-color channels can have any of a variety of channel responses encompassing both visible and non-visible spectral wavelengths in accordance with embodiments of the invention.

An extended-color channel can be used in place of a non-visible channel in the processes discussed above and can be used in a cross-channel fusion process with a visible channel as discussed below.

Cross-channel fusion of a visible channel, such as a green (G) channel, and an extended-color channel in accordance with embodiments of the invention can provide significant benefits during SR processing. Specifically, the desirable characteristics of a near-IR channel are retained (i.e., sensitivity in low light imaging situation), however, the spectral overlap between the extended-color channel and the visible channel significantly increases the correlation between the two channels. The increased correlation can make spatial registration and photometric normalization between the visible channel and the extended-color channel much more robust. For example the magnitude, location, and even existence of edges in the images of the two channels will be much more correlated, and easier to exploit in the SR processing. The overlay with the visible spectrum in the extended color channel definition also provides a degree of safety for the SR processing in cases where the response of the pure near-IR channel (i.e. not overlapping with the visible spectrum) would be very weak due (e.g., due to the characteristics of the materials in the scene) thus reducing the SR factor that could be achieved, by reducing the number of images available for SR processing.

For the reasons outlined, array cameras in accordance with many embodiments of the invention include imager arrays incorporating extended-color imagers. A variety of imager array layouts can be utilized including a layout similar to the layout shown in FIG. 2D. The 5×5 imager array 230 includes four imagers that sense red light (R), four imagers that sense blue light (B), nine imagers that sense green light (G), and eight imagers that sense extended-color (EC). In other embodiments, extended-color imagers can be used in one dimensional array cameras, in different two dimensional array camera configurations to the configuration shown in FIG. 2D, and/or in arrays of array cameras.

Cross-Channel Fusion Processing Pipeline

Figure 12:
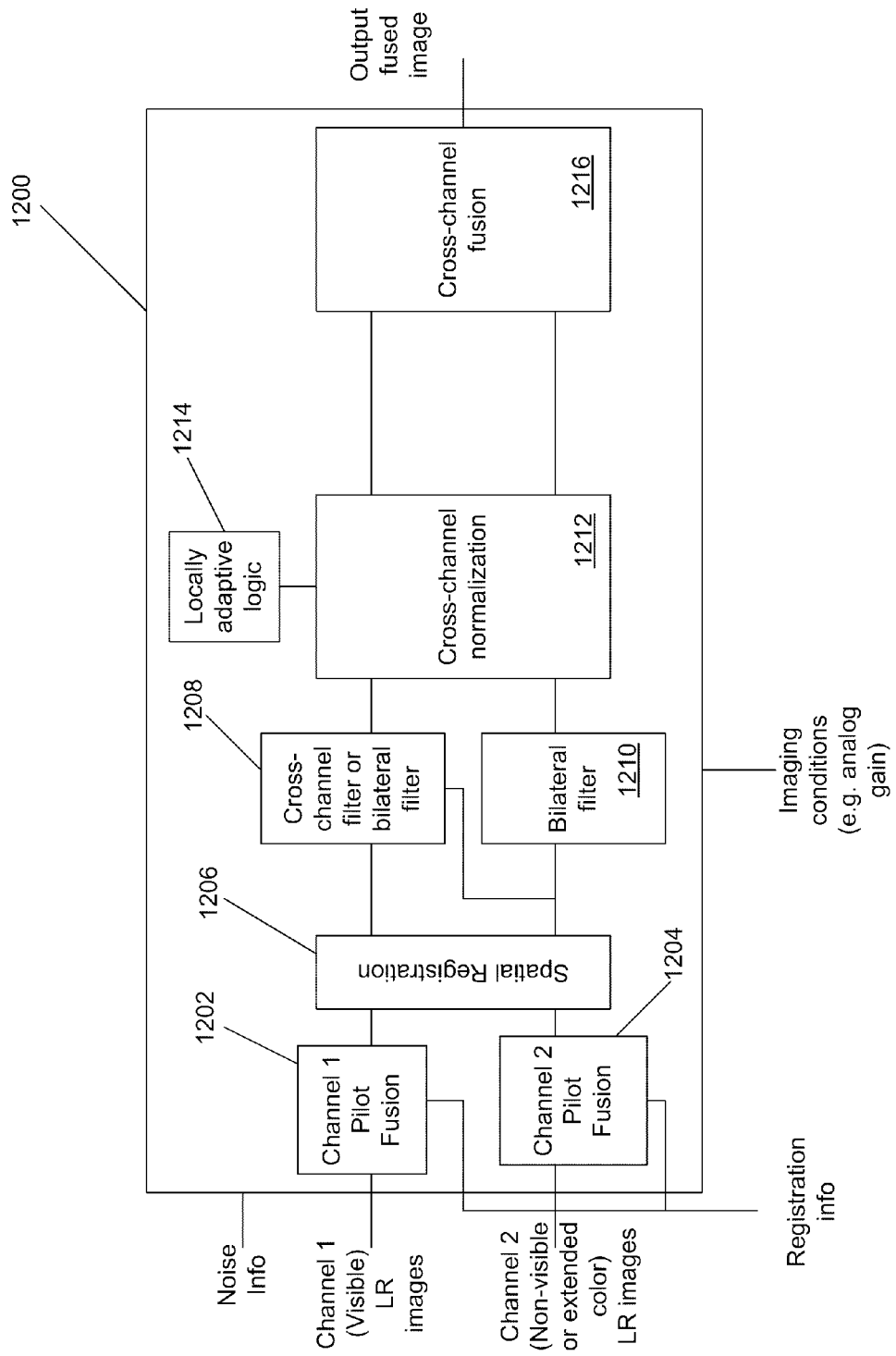
FIG. 12 conceptually illustrates a cross-channel fusion processing pipeline in accordance with an embodiment of the invention.

Processes for performing cross-channel fusion are discussed above between visible and non-visible channels and between a visible channel and an extended-color channel. A cross-channel fusion processing pipeline in accordance with an embodiment of the invention is illustrated in FIG. 12. The SR processing module 1200 accepts as inputs LR images from a first channel, which is usually a visible channel, LR images from a second channel, which is typically a non-visible or extended color channel, registration information, and information concerning the imaging conditions such as, but not limited to, noise information and the analog gain of the imagers used to capture the LR images. The LR images from the first channel and the associated registration information is provided to a first pilot fusion module 1202 and the LR images from the second channel and the associated registration information is provided to a second pilot fusion module 1204. Both pilot fusion modules perform a pilot fusion process similar to the pilot fusion processes described above which fuse the image samples onto an intermediate grid. The intermediate grid is typically higher resolution than the native resolution of the LR images. In a number of embodiments, the resolution of the intermediate grid is L times the height and width of the LR images. The fused images for each channel are provided to a spatial registration module 1206, which spatially registers the two fused images prior to the denoising of the two images. In many embodiments, a first filtering module 1208 performs either cross-channel or bilateral filtering on the first channel fused image depending upon the light conditions when the LR images were captured. A second filtering module 1210 applies a bilaterial filter to the second channel fused image. The denoised images are provided to a cross-channel normalization module 1212, which normalizes the images with the aid of locally adaptive logic 1214. Locally adaptive logic can include criteria for the adjustment of filter windows, strengths, and/or thresholds based on characteristics of the local signal such as local SNR signature. For example, a larger filter window can be used at lower SNR.

As noted above, the cross-channel normalization module can photometrically normalize the denoised images or can photometrically normalize the original fused images. The output of the cross-channel normalization module is provided to a cross-channel fusion module 1216, which fuses the fused image from each channel onto an output grid using a pilot fusion process similar to the pilot fusion processes described above.

Although a specific cross-channel fusion processing pipeline is illustrated in FIG. 12, alternative processing pipelines that fuse information from different channels in a manner acceptable to a specific application can be utilized in accordance with embodiments of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A method of generating a high resolution image of a scene using an imager array including a plurality of imagers that each capture an image of the scene, and a forward imaging transformation for each imager, the method comprising:
    obtaining input images captured by a plurality of imagers, where a first set of input images includes image information captured in a first band of visible wavelengths and a second set of input images includes image information captured in a second band of visible wavelengths and non-visible wavelengths;
    determining an initial estimate of at least a portion of a high resolution image using a processor configured by software to:
        combine image information from the first set of input images into a first fused image;
        combine image information from the second set of input images into a second fused image, wherein the first fused image and the second fused image have the same resolution and the resolution is higher than the resolution of any of the input images;
        spatially register the first fused image and the second fused image;
        denoise the first fused image using a first bilateral filter;
        denoise the second fused image using a second bilateral filter;
        normalize the second fused image in the photometric reference space of the first fused image; and
        combine the first fused image and the second fused image into an initial estimate of at least a portion of the high resolution image; and
    determining a high resolution image that when mapped through the forward imaging transformation matches the input images to within at least one predetermined criterion using the initial estimate of at least a portion of the high resolution image using the processor configured by software;
    wherein each forward imaging transformation corresponds to the manner in which each imager in the imaging array generated the input images; and
    wherein the high resolution image has a resolution that is greater than any of the input images.

2. The method of claim 1, wherein the first band of visible wavelengths and the second band of visible and non-visible wavelengths have some degree of overlap.

3. The method of claim 1, wherein the second band of visible and non-visible wavelengths includes green, red, and near-infrared light.

4. The method of claim 1, wherein:
    the first set of input images are captured by a first set of imagers from the plurality of imagers and the first set of imagers are sensitive to light in the first band of visible wavelengths; and
    the second set of input images are captured by a second set of imagers from the plurality of imagers and the second set of imagers are sensitive to light in the second band of visible and non-visible wavelengths.

5. The method of claim 4, wherein the processor being configured to combine image information from the first set of input images into a first fused image utilizes analog gain and noise information from the first set of imagers and the processor being configured to combine image information from the second set of input images into a second fused image utilizes analog gain and noise information from the second set of imagers.

6. The method of claim 1, wherein the first bilateral filter and the second bilateral filter utilize weights that are a function of both the photometric and geometric distance between a pixel and pixels in the neighborhood of the pixel.

7. The method of claim 1, wherein the first bilateral filter is a cross-channel bilateral filter utilizing weights determined for the second fused image.

8. The method of claim 1, wherein the first set of input images are captured by a first set of imagers from the plurality of imagers and the first bilateral filter is a cross-channel bilateral filter utilizing weights determined for the second fused image when an analog gain value of the first set of imagers is above a predetermined threshold.

9. The method of claim 1, wherein normalizing the second fused image in the photometric reference space of the first fused image comprises applying gains and offsets to pixels of the second fused image.

10. The method of claim 9, wherein the gain for each pixel of the second fused image is determined by the equation:

$$\hat{a} = \frac{\left[\sum_r \sum_c g(r,c) \cdot e(r,c)\right] - N_r N_c \overline{g} \cdot \overline{e}}{\left[\sum_r \sum_c e^2(r,c)\right] - N_r N_c \overline{e}^2},$$

and the bias for each pixel of the second fused image is determined by the equation:

$$\hat{b} = \overline{g} - \hat{a} \cdot \overline{e}$$

where:

$$\overline{e} = \frac{1}{N_r N_c} \sum_r \sum_c e(r,c),$$

$$\overline{g} = \frac{1}{N_r N_c} \sum_r \sum_c g(r,c),$$

e is the second fused image, g is the first fused image, $N_r$ and $N_c$ are the number of pixels horizontally and vertically of the neighborhood of pixels around the pixel, and r and c are row and column indices into the images within the bounds defined by $N_r$ and $N_c$.

11. The method of claim 1, wherein determining an initial estimate of at least a portion of a high resolution image using a processor configured by software further comprises the processor being configured to cross-channel normalize the first fused image in the photometric reference space of the second fused image.

12. The method of claim 11, wherein the processor being configured to cross-channel normalize the first fused image in the photometric reference space of the second fused image comprises the processor being configured to apply gains and offsets to pixels of the first fused image.

13. The method of claim 12, wherein the gain for each pixel of the first fused image is determined by the equation:

$$\hat{a} = \frac{\left[\sum_r \sum_c g(r,c) \cdot e(r,c)\right] - N_r N_c \overline{g} \cdot \overline{e}}{\left[\sum_r \sum_c e^2(r,c)\right] - N_r N_c \overline{e}^2},$$

and the bias for each pixel of the first fused image is determined by the equation:

$$\hat{b} = \overline{g} - \hat{a} \cdot \overline{e}$$

where:

$$\overline{e} = \frac{1}{N_r N_c} \sum_r \sum_c e(r,c),$$

$$\overline{g} = \frac{1}{N_r N_c} \sum_r \sum_c g(r,c),$$

e is the first fused image, g is the second fused image, $N_r$ and $N_c$ are the number of pixels horizontally and vertically of the neighborhood of pixels around the pixel, and r and c are row and column indices into the images within the bounds defined by $N_r$ and $N_c$.

14. The method of claim 1, wherein the processor being configured to normalize the second fused image in the photometric reference space of the first fused image comprises the processor being configured to:
select a first pixel of interest in the second fused image and a first collection of similar pixels in the neighborhood of the first pixel of interest;
select a second pixel of interest in the first fused image corresponding to the first pixel of interest and a second collection of similar pixels in the neighborhood of the second pixel of interest;
determine the intersection of the first collection of similar pixels and the second collection of similar pixels;
calculate gain and offset values using the intersection of the two collections; and
apply the gain and offset values to the appropriate pixels in the second fused image.

15. The method of claim 14 where the intersection of the first collection of similar pixels and the second collection of similar pixels is the set of pixels in the first and second collections having the same corresponding locations in each of the first and second fused images.

16. The method of claim 14 wherein the gain for each pixel in the intersection of the two collections within the second fused image is determined by the equation:

$$\hat{a} = \frac{\left[\sum_r \sum_c g(r,c) \cdot e(r,c)\right] - N_r N_c \overline{g} \cdot \overline{e}}{\left[\sum_r \sum_c e^2(r,c)\right] - N_r N_c \overline{e}^2},$$

and the bias for each pixel in the intersection of the two collections within the second fused image is determined by the equation:

$$\hat{b} = \overline{g} - \hat{a} \cdot \overline{e}$$

where:

$$\overline{e} = \frac{1}{N_r N_c} \sum_r \sum_c e(r,c),$$

$$\overline{g} = \frac{1}{N_r N_c} \sum_r \sum_c g(r,c),$$

e is the second fused image, g is the first fused image, $N_r$ and $N_c$ are the number of pixels horizontally and vertically of the neighborhood of pixels around the pixel, and r and c are row and column indices into the images within the bounds defined by $N_r$ and $N_c$.

17. An array camera configured to generate a high resolution image of a scene using an imager array including a plurality of imagers that each capture an image of the scene, and a forward imaging transformation for each imager, the array camera comprising:

an imager array including a plurality of imagers; and
a processor configured by software to:
  obtain input images captured by the plurality of imagers, where a first set of input images includes image information captured in a first band of visible wavelengths and a second set of input images includes image information captured in a second band of visible wavelengths and non-visible wavelengths;
  determine an initial estimate of at least a portion of a high resolution image by:
    combining image information from the first set of input images into a first fused image;
    combining image information from the second set of input images into a second fused image, wherein the first fused image and the second fused image have the same resolution and the resolution is higher than the resolution of any of the input images;
    spatially registering the first fused image and the second fused image;
    denoising the first fused image using a first bilateral filter;
    denoising the second fused image using a second bilateral filter;
    normalizing the second fused image in the photometric reference space of the first fused image;
    combining the first fused image and the second fused image into an initial estimate of at least a portion of the high resolution image; and
  determine a high resolution image that when mapped through the forward imaging transformation matches the input images to within at least one predetermined criterion using the initial estimate of at least a portion of the high resolution image using the processor configured by software;
  wherein each forward imaging transformation corresponds to the manner in which each imager in the imaging array generated the input images; and
  wherein the high resolution image has a resolution that is greater than any of the input images.

18. The array camera of claim 17, wherein the first band of visible wavelengths and the second band of visible and non-visible wavelengths have some degree of overlap.

19. The array camera of claim 17, wherein the second band of visible and non-visible wavelengths includes green, red, and near-infrared light.

20. The array camera of claim 17, wherein:
the first set of input images are captured by a first set of imagers from the plurality of imagers and the first set of imagers are sensitive to light in the first band of visible wavelengths; and
the second set of input images are captured by a second set of imagers from the plurality of imagers and the second set of imagers are sensitive to light in the second band of visible and non-visible wavelengths.

21. The array camera of claim 20, wherein combining image information from the first set of input images into a first fused image utilizes analog gain and noise information from the first set of imagers and combining image information from the second set of input images into a second fused image utilizes analog gain and noise information from the second set of imagers.

22. The array camera of claim 17, wherein the first bilateral filter and the second bilateral filter utilize weights that are a function of both the photometric and geometric distance between a pixel and pixels in the neighborhood of the pixel.

23. The array camera of claim 17, wherein the first bilateral filter is a cross-channel bilateral filter utilizing weights determined for the second fused image.

24. The array camera of claim 17, wherein the first set of input images are captured by a first set of imagers from the plurality of imagers and the first bilateral filter is a cross-channel bilateral filter utilizing weights determined for the second fused image when an analog gain value of the first set of imagers is above a predetermined threshold.

25. The array camera of claim 17, wherein normalizing the second fused image in the photometric reference space of the first fused image comprises applying gains and offsets to pixels of the second fused image.

26. The array camera of claim 25, wherein the gain for each pixel of the second fused image is determined by the equation:

$$\hat{a} = \frac{\left[\sum_r \sum_c g(r,c) \cdot e(r,c)\right] - N_r N_c \bar{g} \cdot \bar{e}}{\left[\sum_r \sum_c e^2(r,c)\right] - N_r N_c \bar{e}^2},$$

and the bias for each pixel of the second fused image is determined by the equation:

$$\hat{b} = \bar{g} - \hat{a} \cdot \bar{e}$$

where:

$$\bar{e} = \frac{1}{N_r N_c} \sum_r \sum_c e(r,c),$$

$$\bar{g} = \frac{1}{N_r N_c} \sum_r \sum_c g(r,c),$$

e is the second fused image, g is the first fused image, $N_r$ and $N_c$ are the number of pixels horizontally and vertically of the neighborhood of pixels around the pixel, and r and c are row and column indices into the images within the bounds defined by $N_r$ and $N_c$.

27. The array camera of claim 17, wherein the processor is further configured to cross-channel normalize the first fused image in the photometric reference space of the second fused image.

28. The array camera of claim 27, wherein the processor being configured to cross-channel normalize the first fused image in the photometric reference space of the second fused image comprises the processor being configured to apply gains and offsets to pixels of the first fused image.

29. The array camera of claim 28, wherein the gain for each pixel of the first fused image is determined by the equation:

$$\hat{a} = \frac{\left[\sum_r \sum_c g(r,c) \cdot e(r,c)\right] - N_r N_c \bar{g} \cdot \bar{e}}{\left[\sum_r \sum_c e^2(r,c)\right] - N_r N_c \bar{e}^2},$$

and the bias for each pixel of the first fused image is determined by the equation:

$$\hat{b} = \bar{g} - \hat{a} \cdot \bar{e}$$

where:

$$\bar{e} = \frac{1}{N_r N_c} \sum_r \sum_c e(r, c),$$

$$\bar{g} = \frac{1}{N_r N_c} \sum_r \sum_c g(r, c),$$

e is the first fused image, g is the second fused image, $N_r$ and $N_c$ are the number of pixels horizontally and vertically of the neighborhood of pixels around the pixel, and r and c are row and column indices into the images within the bounds defined by $N_r$ and $N_c$.

30. The array camera of claim 17, wherein normalizing the second fused image in the photometric reference space of the first fused image comprises:
 selecting a first pixel of interest in the second fused image and a first collection of similar pixels in the neighborhood of the first pixel of interest;
 selecting a second pixel of interest in the first fused image corresponding to the first pixel of interest and a second collection of similar pixels in the neighborhood of the second pixel of interest;
 determining the intersection of the first collection of similar pixels and the second collection of similar pixels;
 calculating gain and offset values using the intersection of the two collections;
 applying the gain and offset values to the appropriate pixels in the second fused image.

31. The array camera of claim 30 where the intersection of the first collection of similar pixels and the second collection of similar pixels is the set of pixels in the first and second collections having the same corresponding locations in each of the first and second fused images.

32. The array camera of claim 30 wherein the gain for each pixel in the intersection of the two collections within the second fused image is determined by the equation:

$$\hat{a} = \frac{\left[\sum_r \sum_c g(r,c) \cdot e(r,c)\right] - N_r N_c \bar{g} \cdot \bar{e}}{\left[\sum_r \sum_c e^2(r,c)\right] - N_r N_c \bar{e}^2},$$

and the bias for each pixel in the intersection of the two collections within the second fused image is determined by the equation:

$$\hat{b} = \bar{g} - \hat{a} \cdot \bar{e}$$

where:

$$\bar{e} = \frac{1}{N_r N_c} \sum_r \sum_c e(r, c),$$

$$\bar{g} = \frac{1}{N_r N_c} \sum_r \sum_c g(r, c),$$

e is the second fused image, g is the first fused image, $N_r$ and $N_c$ are the number of pixels horizontally and vertically of the neighborhood of pixels around the pixel, and r and c are row and column indices into the images within the bounds defined by $N_r$ and $N_c$.

\* \* \* \* \*